US011345472B2

(12) United States Patent
Ao et al.

(10) Patent No.: US 11,345,472 B2
(45) Date of Patent: *May 31, 2022

(54) UAV HAVING BAROMETRIC SENSOR AND METHOD OF ISOLATING DISPOSING BAROMETRIC SENSOR WITHIN UAV

(71) Applicant: SZ DJI TECHNOLOGY CO., LTD., Shenzhen (CN)

(72) Inventors: Jiyuan Ao, Shenzhen (CN); Xumin Wu, Shenzhen (CN); Tingting Wang, Shenzhen (CN); Zhuang Feng, Shenzhen (CN); Sungki Lee, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/838,518

(22) Filed: Apr. 2, 2020

(65) Prior Publication Data
US 2020/0361605 A1   Nov. 19, 2020

Related U.S. Application Data

(63) Continuation of application No. 15/445,837, filed on Feb. 28, 2017, now Pat. No. 10,611,476, which is a
(Continued)

(51) Int. Cl.
*G01P 5/00* (2006.01)
*B64C 39/02* (2006.01)
(Continued)

(52) U.S. Cl.
CPC ............ *B64C 39/024* (2013.01); *G01L 19/14* (2013.01); *G01P 5/00* (2013.01); *G01P 5/10* (2013.01);
(Continued)

(58) Field of Classification Search
CPC . B64C 39/026; B64C 39/024; B64C 2201/00; B64C 2201/024;
(Continued)

(56) References Cited

U.S. PATENT DOCUMENTS 2,561,633 A  7/1951  Everett
8,123,460 B2  2/2012  Collette
(Continued)

FOREIGN PATENT DOCUMENTS

CN  101300467 A  11/2008
CN  102126554 A  7/2011
(Continued)

OTHER PUBLICATIONS

3 Factors That Kill Sensor Accuracy, and When You Need to Calibrate (https://www.apgsensors.com/about-us/blog/3-factors-that-kill-sensor-accuracy-and-when-you-need-to-calibrate).
(Continued)

*Primary Examiner* — Andre J Allen
(74) *Attorney, Agent, or Firm* — Anova Law Group, PLLC

(57) ABSTRACT

An unmanned aerial vehicle (UAV) includes a housing forming a central body of the UAV and including an internal compartment, one or more electrical components disposed within the internal compartment and configured to affect operation of the UAV, and an inertial measurement unit (IMU) disposed in an external compartment external to the central body. The IMU is isolated from the internal compartment such that a barometric pressure in the external compartment is independent of a barometric pressure in the internal compartment.

20 Claims, 28 Drawing Sheets

Related U.S. Application Data continuation of application No. PCT/CN2015/080525, filed on Jun. 1, 2015.

(51) Int. Cl.
*G01P 5/10* (2006.01)
*G01L 19/14* (2006.01)

(52) U.S. Cl.
CPC .. *B64C 2201/024* (2013.01); *B64C 2201/027* (2013.01); *B64C 2201/042* (2013.01); *B64C 2201/108* (2013.01); *B64C 2201/141* (2013.01)

(58) Field of Classification Search
CPC ........ B64C 2201/042; B64C 2201/108; B64C 2201/141; B64C 2201/146; G01L 19/14; G01L 2019/0053; G01L 19/0092; G01L 19/143; G01C 5/005; G01C 5/06; G05D 1/042; G05D 1/101; G01P 13/025; G01P 5/165; G01P 5/14; G01P 5/16; G01P 13/02; G01P 5/00; G01P 5/02; G01P 21/025; G01P 5/12; G01P 5/26; G01P 5/005; G01P 5/175; G01P 5/18; G01P 5/24; G01P 13/045; G01P 15/036; G01P 1/02; G01P 21/00; G01P 3/62; G01P 5/07; G01P 5/08; G01P 5/245
USPC ...................................... 73/170.02
See application file for complete search history.

(56) References Cited

U.S. PATENT DOCUMENTS

| | | |
|---|---|---|
| 2007/0018036 A1 | 1/2007 | Stephenson |
| 2007/0022807 A1 | 2/2007 | Miller et al. |
| 2009/0055036 A1 | 2/2009 | Vozhdaev et al. |
| 2010/0021288 A1 | 1/2010 | Collette |
| 2012/0083945 A1 | 4/2012 | Oakley et al. |
| 2012/0306332 A1 | 12/2012 | Cardell et al. |
| 2014/0131510 A1 | 5/2014 | Wang et al. |
| 2016/0144954 A1 | 5/2016 | Daigle |
| 2016/0152345 A1 | 6/2016 | Molnar et al. |
| 2016/0347462 A1 | 12/2016 | Clark |

FOREIGN PATENT DOCUMENTS

| | | |
|---|---|---|
| CN | 202481308 U | 10/2012 |
| CN | 103823028 A | 5/2014 |
| JP | 2005528280 A | 9/2005 |
| JP | 2006264528 A | 10/2006 |
| JP | 2006264566 A | 10/2006 |
| JP | 2009269493 A | 11/2009 |
| JP | 2010023825 A | 2/2010 |
| JP | 2011135223 A | 7/2011 |
| JP | 2011240745 A | 12/2011 |
| JP | 2013510760 A | 3/2013 |
| JP | 2013530091 A | 7/2013 |
| JP | 2013530093 A | 7/2013 |
| JP | 2013531573 A | 8/2013 |
| JP | 2013212832 A | 10/2013 |
| JP | 2014528868 A | 10/2014 |
| RU | 134515 U1 | 11/2013 |
| WO | 2015051501 A1 | 4/2015 |

OTHER PUBLICATIONS

Findlay, Kelvin, "3 Factors That Kill Sensor Accuracy, and When You Need to Calibrate." APG, Jul. 10, 2014, www.apgsensors.com/about-us/blog/3-factors-that-kill-sensor-accuracy-and-when-you-need-to-calibrate.

International Search Report dated Sep. 25, 2015 for International Application No. PCT/CN2015/080525.

PCT Written Opinion of the International Search Authority dated Sep. 25, 2015 for International Application No. PCT/CN2015/080525.

UAV HAVING BAROMETRIC SENSOR AND METHOD OF ISOLATING DISPOSING BAROMETRIC SENSOR WITHIN UAV

CROSS-REFERENCE

This application is a continuation of application Ser. No. 15/445,837, filed on Feb. 28, 2017, which is a continuation application of International Application No. PCT/CN2015/080525, filed on Jun. 1, 2015, the contents of both of which are hereby incorporated by reference in their entireties.

BACKGROUND OF THE DISCLOSURE

Exhaust fans are provided beneath respective motors of an unmanned aerial vehicle (UAV), or alternatively, centrifugal fans are provided within respective motors. While the UAV is operating, the air internal to the UAV body is pumped out, and a negative pressure is generated within the UAV body. This negative pressure within the UAV body adversely affects barometric measurement sensors, such as those within an inertial measurement unit, as the pressure within the body of the UAV is not necessarily representative of pressure external to the UAV.

SUMMARY OF THE DISCLOSURE

Systems and methods are provided for placing an inertial measurement unit (IMU) within an unmanned aerial vehicle so as to avoid adverse influence of internal air circulation on barometric sensors within the IMU. These methods are particularly relevant in closed-system UAVs, such as those used for agricultural UAVs. When UAVs are used for agricultural purposes, additional precautions may be taken so as to protect the UAV from external pollution. In particular, the UAV may be sealed, dust-proof, and water-proof so as to avoid any corrosion from pesticides or other agricultural materials. In order to cool the motors and the electronic components within the UAV body, then, an air flow is introduced from outside air to the UAV body. A filter may be provided when introducing the air from outside the UAV. The air that is obtained from outside the UAV may then be provided to the motors using the blades and fans provided at the rotors of the UAV.

In order to avoid being influenced by internal airflow within the body of the UAV, the IMU may be placed in a compartment having a barometric pressure that is independent of the barometric pressure associated with the internal exhaust system within a UAV. The compartment may partially or fully surround the IMU. The IMU may be placed in a compartment that is internal to the housing of the UAV. The IMU may be placed in a compartment that is exposed to outside air. The IMU may be disposed on the payload of the UAV. The IMU may be placed external to the UAV in ambient air.

Accordingly, a UAV as provided herein may have a first compartment that is isolated from a second compartment within the UAV. In particular, the second compartment may be isolated from the first compartment such that the barometric pressure in the second compartment is independent of the barometric pressure in the first compartment. In this way, the use of the term "isolation" may be equivalent to one or more objects of that have independent barometric pressures. One example of objects of isolation may include compartments, as described. Another example of objects of isolation may include sensors and/or electrical components. Accordingly, in an example, the UAV may comprise an arrangement of components so as to isolate one or more sensors, such as an IMU, from one or more electronic components that affect the barometric pressure that is measured using the one or more sensors. Alternatively, the UAV may provide a placement of the one or more sensors so as to lessen the influence of one or more electronic components of the UAV on the barometric pressure that is being read by the one or more sensors, such as the IMU.

An aspect of the disclosure may include an unmanned aerial vehicle (UAV). The UAV may comprise a housing forming a central body of the UAV. The housing may comprise a first compartment and a second compartment. Additionally, the UAV may comprise one or more electrical components that are (1) disposed within the first compartment of the central body and (2) adapted to affect operation of the UAV. The UAV may also comprise one or more sensors disposed within the second compartment of the central body. In particular, the second compartment is isolated from the first compartment such that the barometric pressure in the second compartment is independent of the barometric pressure in the first compartment.

Aspects of the disclosure may also include a method of isolating one or more sensors within an unmanned aerial vehicle (UAV). The method may comprise providing a UAV that includes a housing forming a central body of the UAV. The UAV may also include a first compartment of the central body with one or more electrical components (1) disposed therein, and (2) adapted to affect operation of the UAV. Further, the UAV may include a second compartment of the central body that is isolated from the first compartment such that the barometric pressure in the second compartment is independent of the barometric pressure in the first compartment. Additionally, the method may comprise disposing the one or more sensors within the second compartment of the UAV.

An additional aspect of the disclosure may include an unmanned aerial vehicle (UAV) that comprises a housing forming a central body of the UAV, said housing comprising an internal compartment. The UAV may further comprise one or more electrical components (1) disposed within the internal compartment of the central body and (2) adapted to affect operation of the UAV. Additionally, the UAV may comprise an inertial measurement unit (IMU) disposed externally to the central body. Additionally, the IMU disposed externally to the central body may be isolated from the internal compartment such that the barometric pressure in the external compartment is independent of the barometric pressure in the internal compartment.

A further aspect of the disclosure may include a method of isolating an inertial measurement unit (IMU) within an unmanned aerial vehicle (UAV). The method may comprise providing a UAV that includes a housing forming a central body of the UAV. The UAV may also comprise an internal compartment of the central body with one or more electrical components (1) disposed therein, and (2) adapted to affect operation of the UAV. Additionally, the method may comprise disposing the IMU externally to the central body of the UAV. Additionally, the IMU is isolated from the internal compartment such that the barometric pressure in the external compartment is independent of the barometric pressure in the internal compartment.

Additional aspects of the disclosure may include an unmanned aerial vehicle (UAV) having a housing forming a central body of the UAV. The housing may comprise an internal compartment. Additionally, the UAV may include one or more electrical components that are (1) disposed within the internal compartment of the central body and (2)

adapted to affect operation of the UAV. Further, when the UAV operates, the one or more electrical components may operate at a negative air pressure environment. Additionally, the UAV may include an inertial measurement unit (IMU) disposed in an ambient air pressure environment.

Further aspects of the disclosure may include a method of isolating an inertial measurement unit (IMU) within an unmanned aerial vehicle (UAV). The method may comprise providing a UAV that includes a housing forming a central body of the UAV. The UAV may also include an internal compartment of the central body with one or more electrical components that are (1) disposed therein and (2) adapted to affect operation of the UAV. Additionally, when the UAV operates, the one or more electrical components may operate at a negative air pressure environment. The method may also comprise disposing the IMU in an ambient air pressure environment.

It shall be understood that different aspects of the disclosure can be appreciated individually, collectively, or in combination with each other. Various aspects of the disclosure described herein may be applied to any of the particular applications set forth below or for any other types of movable objects. Any description herein of aerial vehicles, such as unmanned aerial vehicles, may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the disclosure will be obtained by reference to the following detailed description that sets forth illustrative embodiments, in which the principles of the disclosure are utilized, and the accompanying drawings of which:

DETAILED DESCRIPTION OF THE DISCLOSURE

Figure 1:
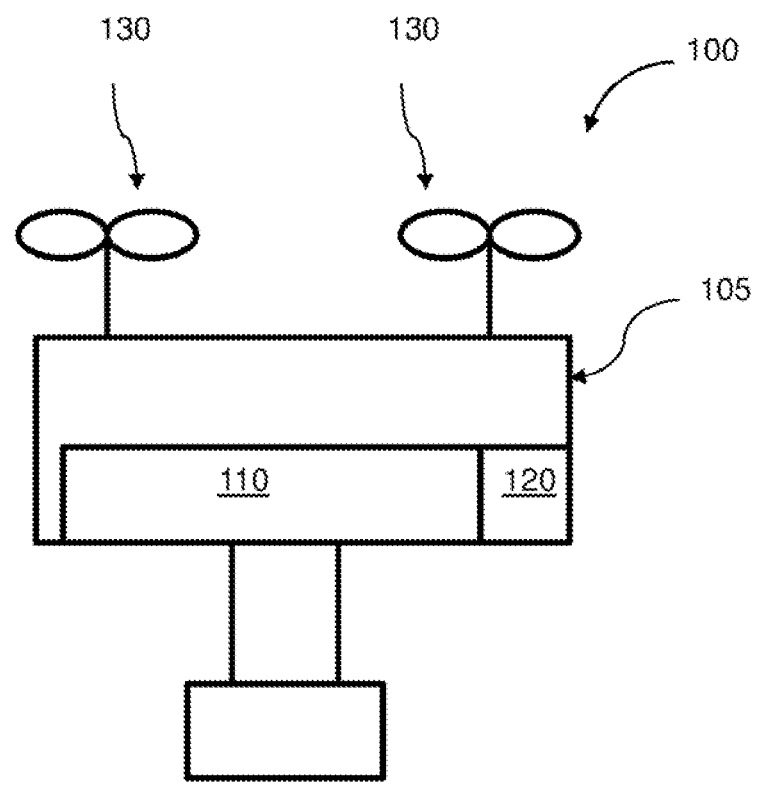
FIG. 1 illustrates a schematic of an unmanned aerial vehicle (UAV) with an isolated compartment within a housing of the UAV, in accordance with embodiments of the disclosure.

The disclosure provides systems, methods, and devices for isolating a sensor. Operation of the sensor may be affected by a pressure of an environment within which the sensor is provided. The sensor may or may not provide an air pressure reading. In one example, the sensor may be an inertial measurement unit (IMU). An IMU may be placed within, or another location with respect to, an unmanned aerial vehicle (UAV) so as to reduce, minimize or eliminate the influence of airflow that is generated within a UAV on the barometric sensors of the IMU. In particular, methods and systems are provided for placing an IMU so as to reduce, minimize or eliminate the influence of internal airflow that is generated within a UAV due to the operation of UAV components. The IMU may be placed to reduce, minimize or eliminate the influence of negative air pressure within the UAV body.

These methods are particularly relevant in closed-system UAVs, which may provide a housing that may enclose one or more components of the UAV. In some embodiments, agricultural UAVs may be closed-system UAVs. When UAVs are used for agricultural purposes, additional precautions may be taken so as to protect the UAV from external pollution. In particular, the UAV may be sealed, dust-proof, and water-proof so as to avoid any corrosion from pesticides or other agricultural materials. A housing of the UAV may be air-tight, water-tight, and/or dust-tight to prevent damage to one or more components within the housing of the UAV. In order to cool the motors and the electronic components within the UAV body, then, an air flow is introduced from outside air to the UAV body. A filter may be provided when introducing the air from outside the UAV. The air that is obtained from outside the UAV may then be provided to the motors using the blades and fans provided at the rotors of the UAV. Air may also enter the UAV as a result of fans or blades turning during the operation of the UAV. The turning of the fans or blades may suck air into the UAV, which may then create a negative pressure which causes additional air to come in.

In order to avoid being influenced by internal airflow within the body of the UAV, one or more sensors, such as the IMU, may be placed in a compartment having a barometric pressure that is independent of the barometric pressure associated with the internal airflow within a UAV. Any description herein of an IMU may apply to any other type of sensor where it may be desirable to obtain the result that the barometric pressure of the sensor is independent of the barometric pressure of the internal airflow within the UAV. Any description herein of an IMU may apply to any other type of sensor that may be affected by ambient air pressure, such as a negative air pressure within a body of the UAV. Any description herein of an IMU may apply to any type of sensor that may measure air pressure or be affected by air pressure. Any description herein of an IMU may apply to any other type of sensor, as discussed further below. The compartment may partially or fully surround the IMU. The IMU may be placed in a compartment that is internal to the housing of the UAV. The IMU may be placed in a compartment that is exposed to outside air. The IMU may be placed external to the UAV in ambient air. The UAV may or may not be provided within a compartment when provided external to the UAV in ambient air.

An IMU may avoid being influenced by internal airflow within the UAV by being placed within an internal compartment that is isolated from the area within the UAV that is exposed to the internal airflow. In particular, the internal airflow of the UAV may occur within a first internal compartment, and the IMU may be placed in a second internal compartment that is isolated from the first internal compartment. The second internal compartment may be isolated from the first internal compartment such that the barometric pressure in the second internal compartment is independent of the barometric pressure in the first internal compartment.

Alternatively, an IMU may avoid being influenced by internal airflow within the UAV by being placed within an external compartment that is isolated from the area within the UAV that is exposed to the internal airflow, such that the barometric pressure in the external compartment is independent of the barometric pressure in the area within the UAV. In particular, the internal airflow of the UAV may occur within a first internal compartment, and the IMU may be placed in a second external compartment that is isolated from the first internal compartment, such that the barometric pressure in the second internal compartment is independent of the barometric pressure in the first internal compartment.

An IMU may also avoid being influenced by internal airflow within the UAV by being placed outside of the UAV so as to be isolated from the area within the UAV that is exposed to the internal airflow. In particular, the internal airflow of the UAV may occur within a first internal compartment, and the IMU may be placed outside of the UAV so as to be isolated from the first internal compartment, such that the barometric pressure of the IMU is independent of the barometric pressure in the first internal compartment.

An IMU may be isolated from an area within the UAV that is exposed to internal airflow. The IMU may be isolated from an area within the UAV that is at a negative pressure relative to ambient environmental air pressure. The IMU may be in an area where the air pressure is independent of air pressure within an area within the UAV that is exposed to internal airflow. Alternatively, The IMU may be in an area where the air pressure is independent of air pressure within an area within the UAV that is subjected to negative pressure. In some instances, an air pressure around the IMU may differ from an air pressure within the UAV exposed to internal airflow by at least 1%, 3%, 5%, 7%, 10%, 15%, 20%, 30%, 40%, or 50%.

The IMU may be provided in an area where the air pressure is the ambient environmental air pressure. The IMU may be provided in an area where the air pressure is atmospheric pressure, or within plus or minus 1%, 3%, 5%, 7%, 10%, 15%, or 20% of atmospheric pressure. The IMU may optionally not be isolated from an ambient environmental air pressure, and the barometric pressure of the IMU is not independent of the barometric pressure in the ambient environmental. The air pressure of an area within which the IMU is provided may optionally not be independent of an ambient environmental air pressure. In some embodiments, an air pressure around an IMU may be more affected by ambient environmental air pressure than an area subject to internal airflow of the UAV. For instance the air pressure around the IMU may be more than 2 times, 3 times, 5 times, 10 times, 20 times, 50 times, 100 times, 200 times, 500 times, or 1000 times affected by ambient environmental air pressure compared to air pressure of an subject to internal airflow of the UAV.

Additionally, an IMU may be less influenced by internal airflow within the UAV when the IMU is placed at a location within a compartment so as to minimize influence of electrical components within the same compartment. In particular, the IMU may be placed in a position that is isolated from an internal airflow, or less influenced by an internal airflow, than other areas within the compartment of the UAV.

Examples of isolated inertial measurement units (IMUs) are provided, as illustrated in figures below. FIG. 1 illustrates a schematic of an unmanned aerial vehicle (UAV) 100 with an isolated compartment 120 within a housing 105 of the UAV, in accordance with embodiments of the disclosure. The isolated compartment 120 has a barometric pressure that is independent of a barometric pressure of a separate, internal compartment 110 within the housing 105 of the UAV 100. The isolated compartment 120 within FIG. 1 may be an internal compartment within a housing 105 of the UAV 100. The separate internal compartment 110 may be the rest of the interior of the housing 105 of the UAV 100 outside the isolated compartment 120 without requiring any additional partitions or dividers. Alternatively, the separate internal compartment 110 may be an additional compartment that does have a partition or divider to another interior section of the housing 105. The separate internal compartment 110 may be in fluidic or barometric communication with one or more fans within or near the rotors, which may cause internal air flow within the UAV 100. The fans may cause a negative air pressure within the housing 105 of the UAV 100, wherein said separate internal compartment may be subjected to the negative air pressure.

The isolated compartment 120 may be isolated from the other internal compartment or interior portion of the UAV. The barometric pressure of the isolated compartment may be independent of the barometric pressure within the other internal compartment or interior portion of the UAV. In some embodiments, the isolated compartment may or may not be isolated from ambient environmental barometric pressure. For instance, air pressure of the isolated compartment may depend on the ambient environmental barometric pressure. The air pressure of the isolated compartment may substantially patch the air pressure of the ambient environment. The barometric pressure of the isolated compartment may deviate from the air pressure of the ambient environment by less than 1%, 3%, 5%, 7%, 10%, 15%, 20%, of 30%. One or more vents may be provided between the isolated compartment and the ambient environment. Alternatively, no vents may be provided. The isolated compartment may not be subjected to the internal airflow caused by the fans as previously described. One or more physical partitions or dividers may isolate the isolated compartment from the rest of the internal space within a housing of the UAV.

The UAV 100 may be configured to fly in response to a signal from a remote terminal. The UAV may respond to manual instructions provided by a user via the remote terminal. The UAV may be configured to operate autonomously or semi-autonomously. The UAV may be capable of flight autonomously in accordance with instructions from one or more processors without requiring input from a user.

The UAV may be capable of flight with the aid of one or more propulsion units 130 on-board the UAV. The propulsion units may include one or more rotors driven by one or more actuators. The rotors may include one or more rotor blades that may generate lift for the UAV. The rotor blades may rotate to generate lift for the UAV. In some embodiments, the UAV may include multiple propulsion units (e.g., two or more, three or more, four or more, five or more, six or more, seven or more, eight or more, nine or more, or ten or more propulsion units). The propulsion units may be capable of generating lift for the UAV. The propulsion units may operate in accordance with a flight control unit. The flight control unit may be on-board the UAV. The flight control unit may generate signals to control the propulsion units in accordance with signals from a remote terminal. The UAV may be capable of taking off and/or landing vertically with aid of the one or more propulsion units.

The UAV may comprise a central body. One or more arms may extend from the central body. In some embodiments, the arms may extend radially from the body. The arms may extend symmetrically from the UAV. The UAV may have two halves that may mirror one another. The arms may be radially symmetric from one another. The arms may or may not be equally spaced apart from one another. The one or more propulsion units may be supported by the one or more arms of the UAV. For instance, the one or more propulsion units may be attached to the arms of the UAV. The one or more propulsion units may be attached at or near the end of the arms of the UAV. The one or more propulsion units may be positioned within 50%, 40%, 30%, 25%, 20%, 15%, 10%, 5%, 3%, 1%, or 0.5% of the end of the arms, along the length of the arm.

The UAV may have a housing 105. The housing may partially or completely enclose one or more components of the UAV. The housing may form the central body. The housing may form an enclosure of the central body. The housing may or may not form the arms or a portion of the arms. The housing may or may not form an enclosure of the arms. In some embodiments, the arms may be separably attached to the central body. Alternatively, the arms may be affixed to the central body, or may be integrally formed with the central body. The one or more arms may communicate with the central body of the housing. In examples, the one or more arms may communicate with an internal compartment of the center body. The central body of the housing may include a first compartment of the housing. In examples, the one or more arms may communicate with the first compartment of the housing. In some examples, the air flow into the central body is generated by the one or more arms. In particular, one or more rotors may be mounted on at least one arm of the one or more arms. In examples, the air flow may be generated by rotating the one or more rotors mounted on the at least one arm. In some examples, the operation of the one or more rotors may affect conditions within the first compartment of the central body.

A housing may be formed of a single piece or multiple pieces. The housing may form a single integral piece for the central body and/or the arms. Alternatively, the housing may be a single integral piece for the central body while the arms are formed from separate pieces. In some instances, the housing may be formed as multiple pieces for the central body. The housing may be formed as multiple pieces for the central body and the arms. In some instances, the housing may form a shell or cover that may enclose one or more components.

The housing may define an interior space or cavity. The interior space or cavity may contain one or more electrical components of the UAV. For example, the flight control unit may be provided within the interior space or cavity of the housing. Other examples of components that may be within the interior cavity may include sensors, navigation units (e.g., global positioning system (GPS), inertial measurement unit (IMU), communication units (e.g., for direct or indirect forms of communication), image processing units, payload data or control units, power control units, or any other type of components. For instance, a power source may power the UAV that may be provided within an interior space or cavity. The housing may encompass or enclose one or more of these components.

Figure 2:
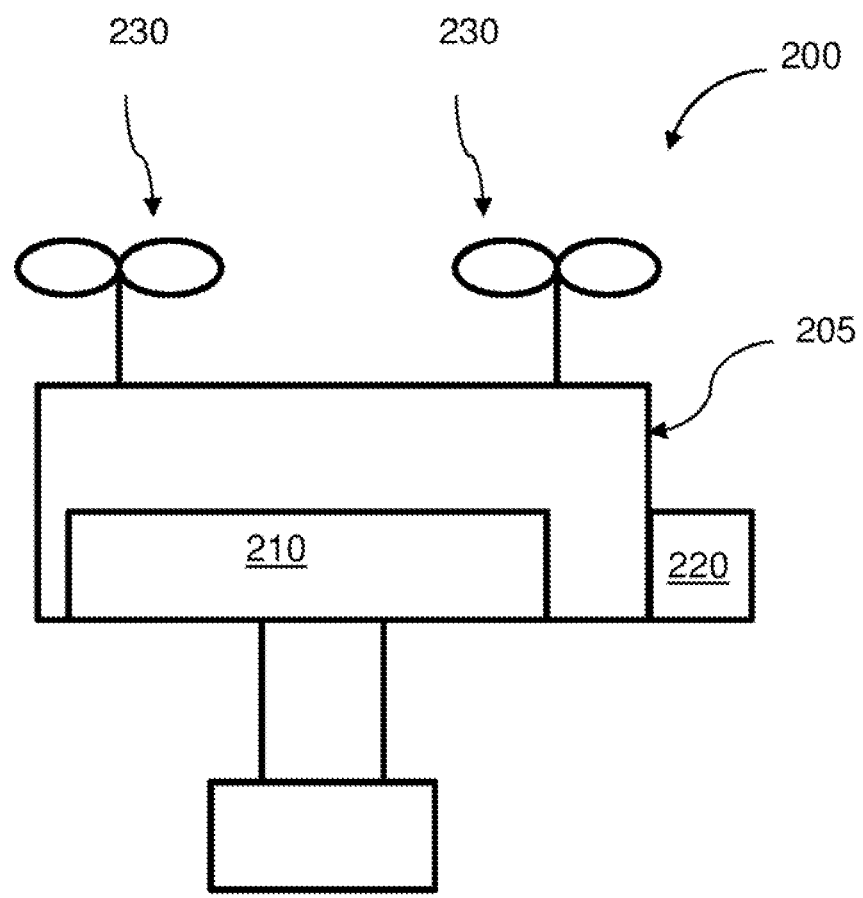
FIG. 2 illustrates a schematic of an unmanned aerial vehicle (UAV) with an isolated compartment external to a housing of the UAV, in accordance with embodiments of the disclosure.
Figure 3:
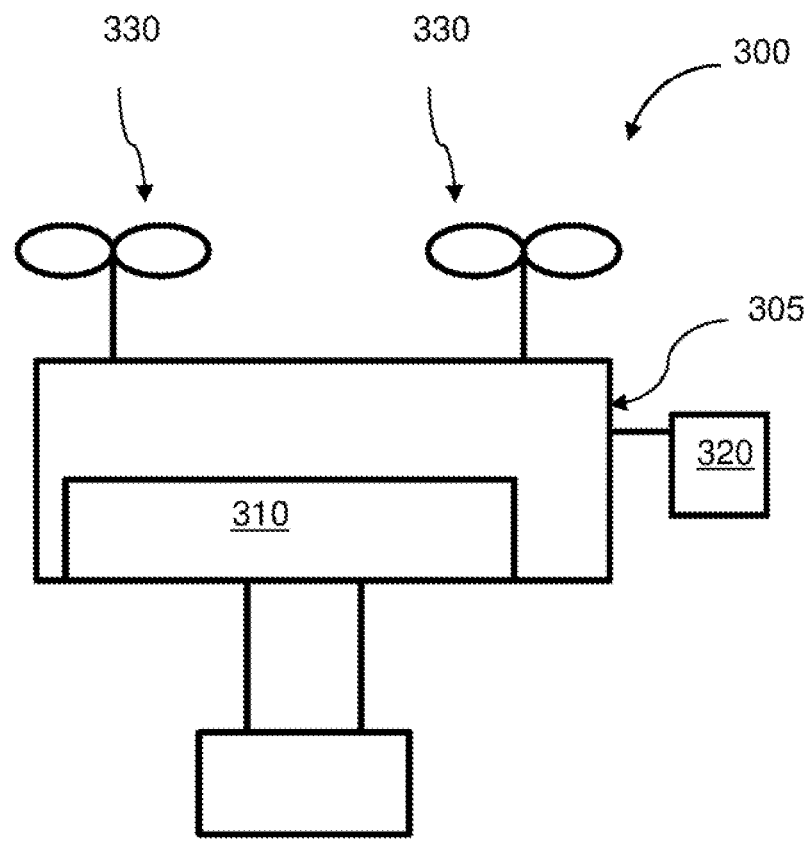
FIG. 3 illustrates a schematic of an unmanned aerial vehicle (UAV) with an isolated compartment that is in ambient air, in accordance with embodiments of the disclosure.

The UAV may include a compartment that is separate from components that may adversely influence a measurement of barometric pressure. For example, the housing may include an isolated compartment within its interior space or cavity. The isolated compartment may be internal to the housing, as illustrated in FIG. 1. The housing may form a compartment, or a portion of a compartment, within its walls. The housing may share a wall with an external compartment, as illustrated in FIG. 2. The housing may be connected to an external compartment that is otherwise separate from the housing, as illustrated in FIG. 3. The housing may form a base component that holds one or more sensors that include an inertial measurement unit (IMU). The one or more sensors may be based at a portion of the housing and extend outwards from the housing. The one or more sensors may extend vertically up, vertically down, horizontally, or at an angle from the housing.

The UAV may comprise one or more sensors to determine the temperature or pressure of the UAV. The UAV may further comprise other sensors that may be used to determine a location of the UAV, such as global positioning system (GPS) sensors, inertial sensors which may be used as part of or separately from an inertial measurement unit (IMU) (e.g., accelerometers, gyroscopes, magnetometers, barometer), lidar, ultrasonic sensors, acoustic sensors, WiFi sensors. The UAV can have sensors on board the UAV that collect information directly from an environment without contacting an additional component off board the UAV for additional information or processing. For example, a sensor that collects data directly in an environment can be a vision or audio sensor. Alternatively, the UAV can have sensors that are on board the UAV but contact one or more components off board the UAV to collect data about an environment. For example, a sensor that contacts a component off board the UAV to collect data about an environment may be a GPS sensor or another sensor that relies on connection to a another device, such as a satellite, tower, router, server, or other external device. Various examples of sensors may include, but are not limited to, location sensors (e.g., global positioning system (GPS) sensors, mobile device transmitters enabling location triangulation), vision sensors (e.g., imaging devices capable of detecting visible, infrared, or ultraviolet light, such as cameras), proximity or range sensors (e.g., ultrasonic sensors, lidar, time-of-flight or depth cameras), inertial sensors (e.g., accelerometers, gyroscopes, inertial measurement units (IMUs)), altitude sensors, attitude sensors (e.g., compasses) pressure sensors (e.g., barometers), audio sensors (e.g., microphones) or field sensors (e.g., magnetometers, electromagnetic sensors). Any suitable number and combination of sensors can be used, such as one, two, three, four, five, or more sensors. Optionally, the data can be received from sensors of different types (e.g., two, three, four, five, or more types). Sensors of different types may measure different types of signals or information (e.g., position, orientation, velocity, acceleration, proximity, pressure, etc.) and/or utilize different types of measurement techniques to obtain data. For instance, the sensors may include any suitable combination of active sensors (e.g., sensors that generate and measure energy from their own energy source) and passive sensors (e.g., sensors that detect available energy). As another example, some sensors may generate absolute measurement data that is provided in terms of a global coordinate system (e.g., position data provided by a GPS sensor, attitude data provided by a compass or magnetometer), while other sensors may generate relative measurement data that is provided in terms of a local coordinate system (e.g., relative angular velocity provided by a gyroscope; relative translational acceleration provided by an accelerometer; relative attitude information provided by a vision sensor; relative distance information provided by an ultrasonic sensor, lidar, or time-of-flight camera). The sensors onboard or off board the UAV may collect information such as location of the UAV, location of other objects, orientation of the UAV, or environmental information. A single sensor may be able to collect a complete set of information in an environment or a group of sensors may work together to collect a complete set of information in an environment. Sensors may be used for mapping of a location, navigation among locations, detection of obstacles, detection of a target, or measurement of barometric pressure.

The UAV may include an IMU that is isolated from one or more areas of the UAV. The IMU may be separated from one or more areas of the UAV having negative air pressure, such as areas that are affected by internal circulation of air due to motors. In particular, an air suction system may be housed in the body of the UAV. The air suction system may pull air into the UAV. The air suction system may comprise a negative pressure source such as a vacuum pump. The air suction system may pull air into the UAV at a constant or variable rate.

The air suction system may filter and chill the air that is pulled into the UAV. The air suction system may comprise one or more filters. The filters may be configured to remove particulates from the air. The filters may include one or more high efficiency particle arrestance (HEPA) filters. The filters can include one or more fiber glass filters. The filters can be disposable. The filters can be replaceable. The filters can be reusable. The filters can be washable. The air suction system can comprise one or more chillers configured to decrease the temperature of air that is pulled into the UAV. The chiller can be a heat exchanger. The heat exchanger can decrease the temperature of the air by conduction and/or convection. The chiller can decrease the temperature of the air to a predetermined temperature.

After the air is chilled and/or filtered the air can be provided to the one or more rotors to cool the rotors and prevent the rotors from overheating. In some systems the rotors can be exposed to ambient air and cooled by ambient air. In the UAV provided herein the rotors can be sealed off from ambient air such that liquids and particulates present in the ambient air do not contact the rotor. As described herein the air can be routed from the body of the UAV to the one or more rotors through the UAV arm which includes the stem and one or more branches. A joint space between the stem and the one or more branches can be sealed from the ambient by one or more of the sealing methods described herein. Sealing the joint space between the stem and the one or more branches can prevent outside dust and/or liquids from contaminating the air that has been purified and chilled by the air suction system. The air delivered to the one or more rotors can be chilled and free of particulates. Accordingly, the transfer of air from the internal portion of the UAV to the motors of the UAV may result in negative air pressure when the UAV is a closed-system, such as when the UAV is used for agricultural purposes.

In order to be isolated, the IMU may be within a separate compartment that is apart from one or more areas of the UAV having negative pressure. The compartment may have a barometric pressure that is independent of the barometric pressure of another part of the UAV. For instance, the isolated IMU may be mounted within the UAV, such as within a housing of the UAV. The IMU may be within a compartment that is mounted within the UAV, such as within the housing of the UAV. The compartment may share a portion of the housing of the UAV, such as sharing a wall with the housing of the UAV. The compartment may include a cavity that is formed within the housing of the UAV. The housing of the UAV may have a portion that extends so as to partially block airflow from a portion of the UAV having negative pressure to the portion of the UAV that is holding the IMU. In examples, a UAV housing may have a first compartment that includes one or more electrical components that affect airflow within the UAV and the UAV may have a second compartment that is isolated from the first compartment, such that the barometric pressure of the second compartment is independent of the barometric pressure in the first internal compartment. Further, the first compartment may be an internal compartment of the housing of the UAV and the second compartment may also be an internal compartment to the housing of the UAV.

In some implementations, the isolated compartment may be attached to an internal wall of the housing of the UAV, as seen in FIG. 1. The isolated compartment may be attached to an interior surface of the housing. The isolated compartment may be attached to a floor, side-wall, or ceiling of the housing. The isolated compartment, or any components thereof, may be arranged on the UAV so that the components of the UAV remain fixed relative to the UAV. Alternatively, the isolated compartment may be externally mounted to the UAV. One or more components of the isolated compartment may be mounted externally to the UAV. Any description herein of an isolated compartment may apply to any individual components of the isolated compartment as described anywhere herein.

The isolated compartment internal to the housing of the UAV may optionally not extend outside the housing of the UAV. The isolated compartment may have an exterior covering or opening that may permit a user to access the internal isolated compartment. The exterior cover or opening may follow a contour or line of the housing. The isolated compartment may be provided so as to not interrupt or visually disrupt the external surface of the housing. Any opening or cover may be in-line with the outer surface of the housing to be visually pleasing. Similarly, the opening or cover may be in-line with the outer surface of the housing to reduce or minimize aerodynamic effects, such as drag.

When the isolated compartment is within the housing, the isolated compartment may be shielded from an external environment. The isolated compartment may be at least partially shielded from wind, dust, or precipitation. The isolated compartment or may or may not be air-tight or fluid-tight. The isolated compartment may prevent dust or water from entering the compartment and damaging sensors therein, such as an IMU. The isolated compartment may or may not permit air or wind to enter the compartment. The isolated compartment may or may not be affected by the ambient air pressure. In some embodiments, filters or membranes may be provided that may prevent dust or water from entering while permitting airflow within the compartment. When the isolated compartment is outside the housing, the isolated compartment may or may not be shielded from the external environment. In some embodiments, an external cover may cover a portion of the isolated compartment. Alternatively, the isolated compartment may be completely exposed to the external environment.

The isolated compartment may be mounted such that the center of gravity of the isolated compartment is lower than the center of gravity of the UAV as a whole. The isolated compartment may be mounted such that the center of gravity of the isolated compartment is within a central region of the UAV. The isolated compartment may be mounted so that the center of gravity of the isolated compartment is not too offset to the side. The isolated compartment may be arranged so that it is laterally within about equal to or less than 50%, 40%, 30%, 20%, 10%, 5%, 3%, or 1% of a center of the UAV.

The isolated compartment may move with the body of the UAV. Movement in a central body of the UAV may result in corresponding movement of the isolated compartment. One or more sensors within the isolated compartment may be subject to movement of the body of the UAV. For instance, an IMU within the isolated compartment may move with the UAV as the UAV moves. It may be directly or rigidly coupled to the body of the UAV. Thus, measurements by the IMU may be directly reflective of movements of the body of the UAV.

The IMU may operate while the UAV is flight. The IMU may measure and report characteristics of the UAV, such as the orientation, velocity, gravitational forces, and other characteristics. The information determined by the IMU may be used to help in navigation of the UAV. The IMU may utilize sensors of the UAV such as those previously discussed, and in particular may utilize a magnetometer, accelerometer, gyroscope in determining characteristics of the UAV. Operation of the IMU may include recording conditions of flight. The IMU may operate while the UAV is landed. The IMU may optionally be prevented from operating while the UAV is landed. The IMU may be able to operate only while the UAV is flight. The IMU may automatically start operating while the UAV is in flight. The IMU may automatically start operating when the UAV reaches a predetermined altitude. Alternatively, the IMU may operate in response to a user command to operate. The user command to operate may be delivered with aid of a remote terminal.

The IMU may operate with aid of a power source of the one or more sensors within the UAV. The power source of the one or more sensors within the UAV may or may not be the same as a power source that powers one or more propulsion units of the UAV. The power source of the one or more sensors may or may not be the same as a power source that powers one or more electrical components of the UAV. The power source of the IMU may be provided within a housing of the UAV. The power source of the IMU may alternatively be provided outside the housing of the UAV.

FIG. 2 illustrates another schematic of an unmanned aerial vehicle (UAV) 200 with an isolated compartment 220 within a housing 205 of the UAV, in accordance with embodiments of the disclosure. The isolated compartment has a barometric pressure that is independent of a barometric pressure of a separate, internal compartment 210 within the housing of the UAV. The UAV may be capable of flight with the aid of one or more propulsion units 230 on-board the UAV. The isolated compartment within FIG. 2 is an external compartment.

The isolated compartment may be external to the housing of the UAV. The isolated compartment may share a wall with an external portion of a UAV, as illustrated in FIG. 2. The isolated compartment may be fully external to the UAV. The isolated compartment may be partially external to the UAV. A portion of an externally disposed isolated compartment may be attached to an interior surface of the housing. A portion of the externally disposed isolated compartment may be attached to a floor, an exterior floor, side-wall, an exterior sidewall, a ceiling, or an exterior ceiling of the housing. The isolated compartment, or any components thereof, may be arranged on the UAV so that the components of the UAV remain fixed relative to the UAV. Alternatively, the isolated compartment may be externally mounted to the UAV. In particular, when the isolated compartment is externally mounted to the UAV, the externally mounted isolated component may not be within an internal portion of the UAV. One or more components of the isolated compartment may be mounted externally to the UAV. One or more components of the isolated compartment may be exposed to outside air. One or more components of the isolated compartment may be exposed to ambient air pressure. Isolated compartments that are externally mounted on the UAV may appear to disrupt the shape of the UAV. For example, the isolated compartment that is externally mounted on the UAV may appear as a bump on the surface of the UAV. In example, the isolated compartment that is externally mounted on the UAV may appear to smoothly project from the exterior of the UAV or may appear to have sharp edges. Alternatively, the isolated compartment that is externally mounted on the UAV may appear to follow the contour of the housing.

When a portion of the isolated compartment is within the housing, some of the isolated compartment may be shielded from an external environment. The isolated compartment may be at least partially shielded from wind, dust, or precipitation. When the isolated compartment is outside the housing, the isolated compartment may or may not be shielded from the external environment. In some embodiments, an external cover may cover a portion of the isolated compartment. Any description herein of an isolated compartment may apply to any individual components of the isolated compartment as described anywhere herein.

In examples, a UAV housing may have a first compartment that includes one or more electrical components that affect internal airflow within the UAV and the UAV may have a second compartment that is isolated from the first compartment. Further, the first compartment may be an internal compartment of the housing of the UAV whereas the second compartment may be an external compartment to the housing of the UAV. Additionally, the housing may have one or more temperature sensors within the housing. The housing may also include a temperature regulating component within the housing. In particular, the temperature regulating component may decrease the temperature in the housing when inhaled air has a temperature above a threshold. Additionally, the temperature regulating component may increase the temperature in the housing when inhaled air has a temperature below a threshold.

FIG. 3 illustrates a further schematic of an unmanned aerial vehicle (UAV) 300 with an isolated compartment 320 of the UAV, in accordance with embodiments of the disclosure. The isolated compartment has a barometric pressure that is independent of a barometric pressure of a separate, internal compartment 310 within the housing of the UAV. The UAV may be capable of flight with the aid of one or more propulsion units 330 on-board the UAV. The isolated compartment within FIG. 3 is external to the UAV.

The isolated compartment in FIG. 3 may be external to the UAV. The isolated compartment may be operably connected to the housing 305 of the UAV. As seen in FIG. 3, the isolated compartment may be indirectly connected to the housing of the UAV. One or more components of the isolated compartment may be exposed to outside air. One or more components of the isolated compartment may be exposed to ambient air pressure. Additionally, the isolated compartment as provided in FIG. 3 may be attached to the UAV using rigid coupling. As such, the isolated compartment may move with the UAV body when the body of the UAV moves. Additionally, the isolated compartment may extend away from the body of the UAV. Further, the isolated compartment may extend away from the body of the UAV at varying angles. When an IMU is disposed within the isolated compartment, the IMU may be used to measure positional information relating to a central body of the UAV. Additionally, the IMU may be used to measure angular position, angular velocity, angular acceleration, translational positional, linear velocity, or linear acceleration of the UAV. In examples, the IMU may be disposed within the isolated compartment as the only sensor. In other examples, the IMU may be disposed with the isolated compartment with one or more additional sensors. Additionally, an IMU may be used to measure positional information for a payload, such as a pumping system or camera. In examples, the IMU may be disposed on the payload of the UAV.

Figure 4:
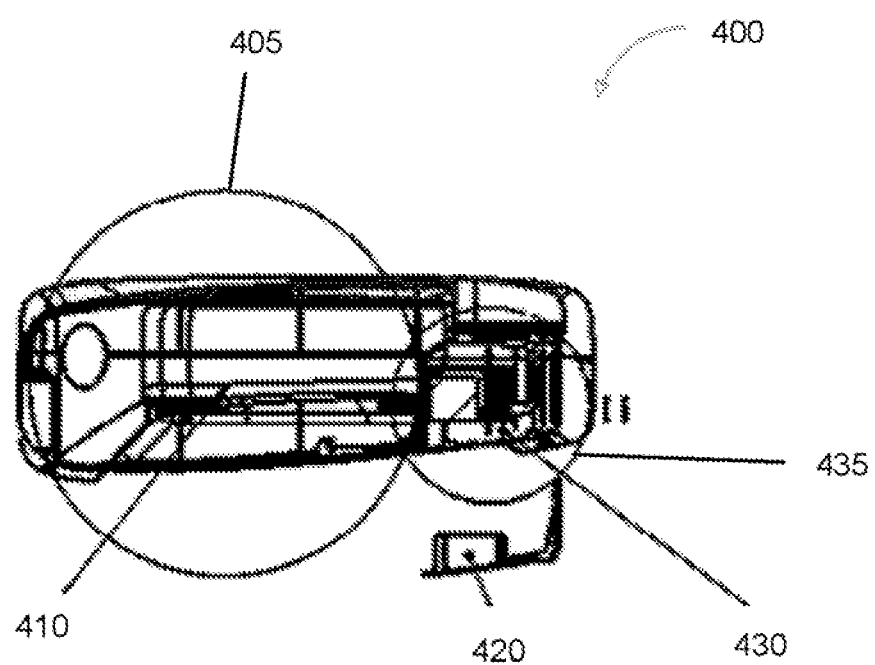
FIG. 4 illustrates a cross-sectional view of an internal housing of an unmanned aerial vehicle (UAV) having an inertial measurement unit (IMU) disposed in an isolated compartment within the internal housing of the UAV, in accordance with embodiments of the disclosure.

FIG. 4 illustrates a cross-sectional view 400 of a housing of an unmanned aerial vehicle (UAV) having an inertial measurement unit (IMU) disposed in an isolated compartment within the internal housing of the UAV, in accordance with embodiments of the disclosure. The internal housing comprises a view 405 of an internal cavity 410. When airflow passes through the internal cavity 410 of the UAV to the exhaust fans (not shown), negative pressure may be generated within the internal cavity. Additionally, the internal housing also comprises a view 435 of an external cavity 430. An inertial measurement unit (IMU) may be placed within the external cavity 430. Additionally, the internal housing may comprise a lower cover 420 for covering an IMU that is disposed within the external cavity.

Figure 5:
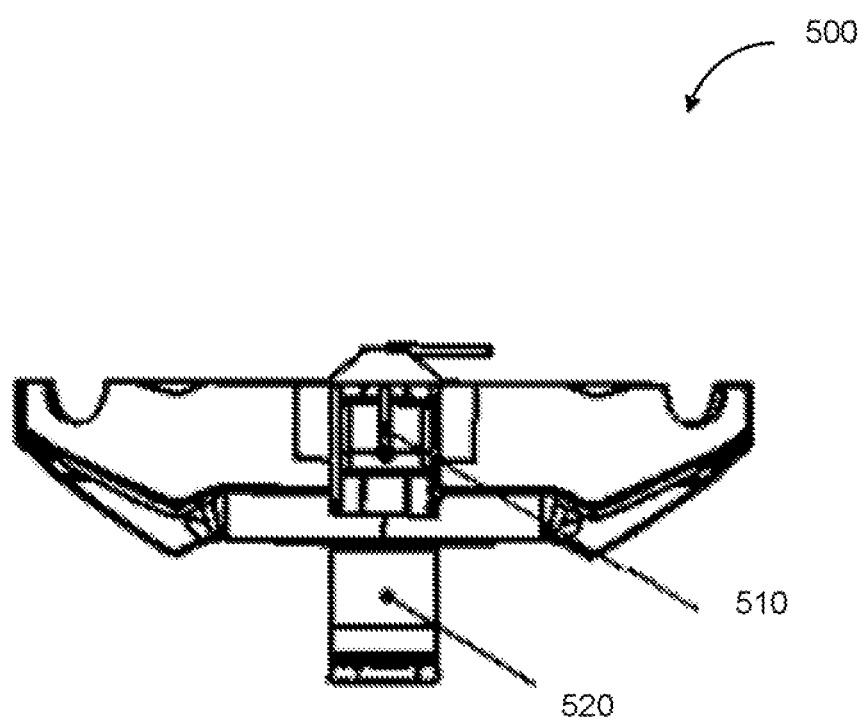
FIG. 5 illustrates a placement of an inertial measurement unit (IMU) within a lower portion of a housing of an unmanned aerial vehicle (UAV) with an opened lower cover, in accordance with embodiments of the disclosure.

FIG. 5 illustrates a placement of an inertial measurement unit (IMU) 510 within a lower portion 500 of a housing of an unmanned aerial vehicle (UAV) with an opened lower cover 520, in accordance with embodiments of the disclosure. The lower cover may be used to protect the IMU from external contaminants. The lower cover may be sealed. The lower cover may be dustproof. The lower cover may be waterproof. As seen in FIG. 5, the IMU 510 is placed on a peripheral portion of the housing of the UAV.

Figure 6:
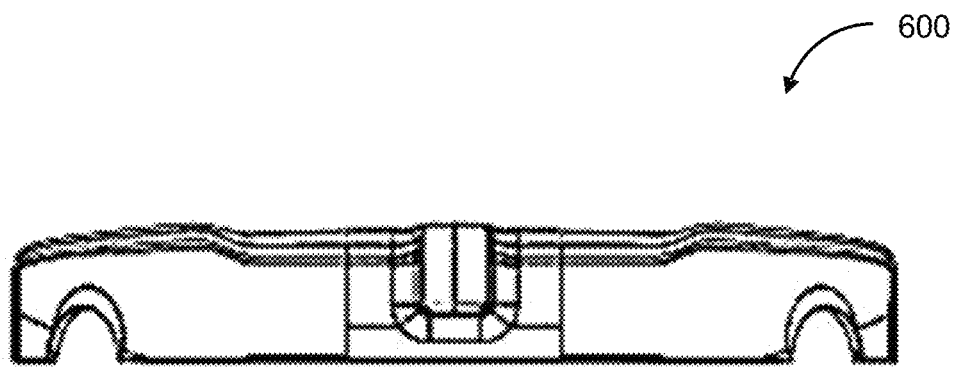
FIG. 6 illustrates a front view of an upper portion of a UAV housing, in accordance with embodiments of the disclosure.
Figure 7:
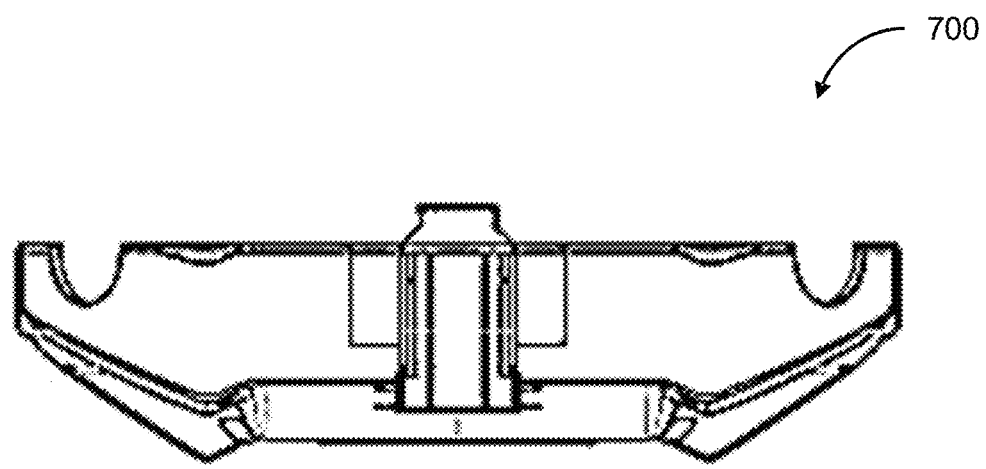
FIG. 7 illustrates a front view of a lower portion of a UAV housing, in accordance with embodiments of the disclosure.
Figure 8:
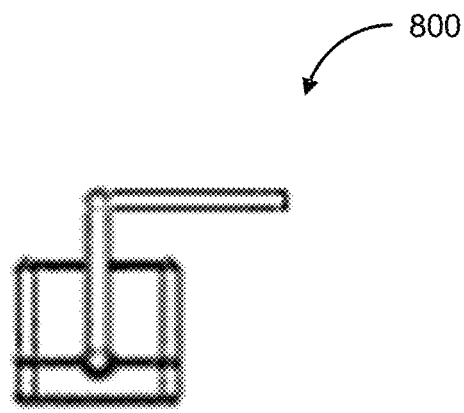
FIG. 8 illustrates a front view of an inertial measurement unit (IMU), in accordance with embodiments of the disclosure.
Figure 9:
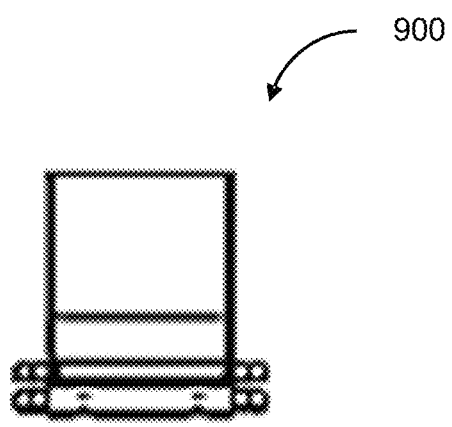
FIG. 9 illustrates a front view of a lower cover for IMU placement, in accordance with embodiments of the disclosure.
Figure 20:
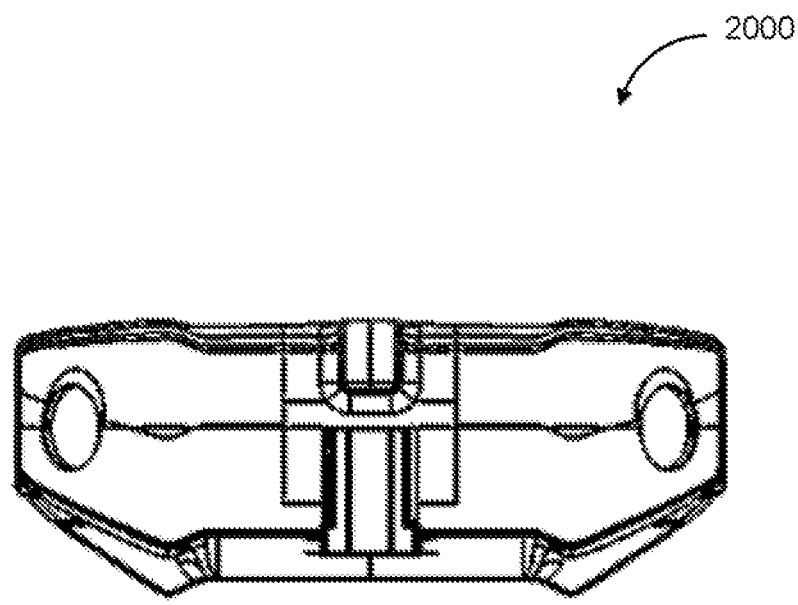
FIG. 20 illustrates a front view of a UAV housing having an opened lower cover for IMU placement, in accordance with embodiments of the disclosure.
Figure 21:
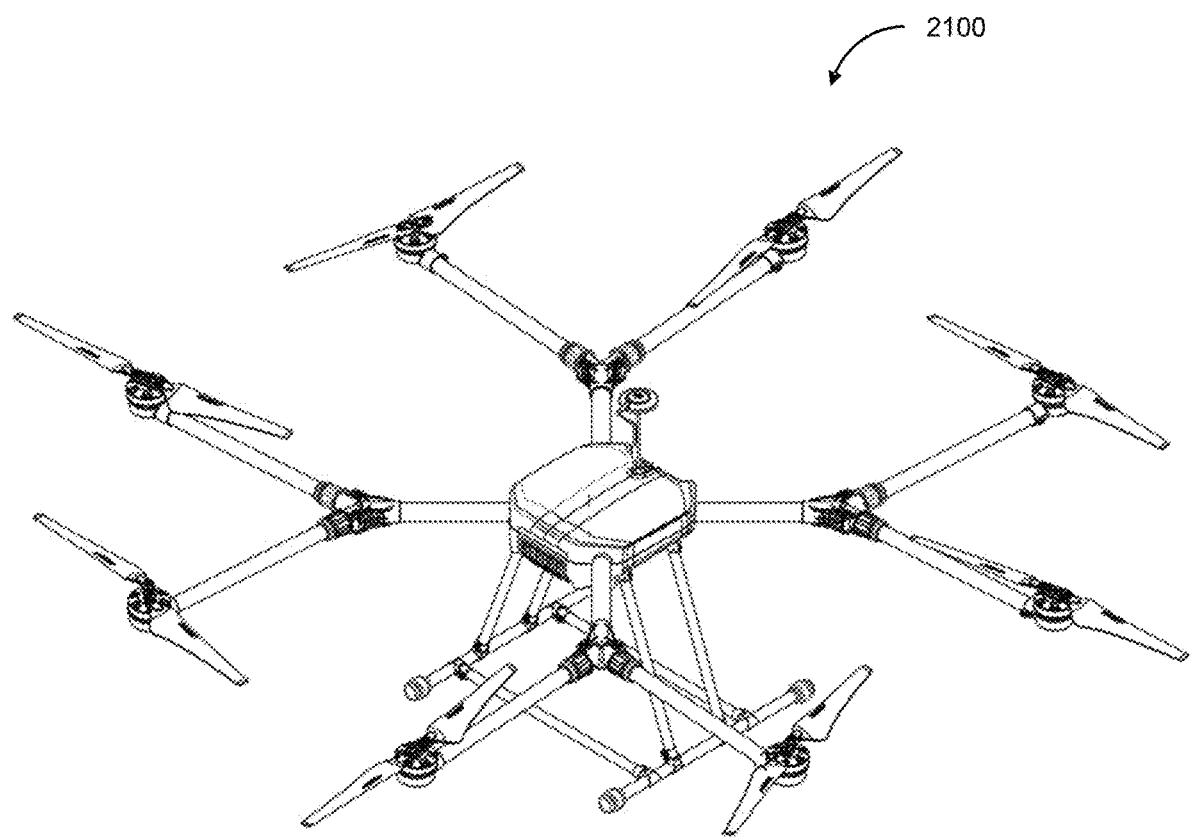
FIG. 21 illustrates a back perspective view of an unmanned aerial vehicle having an inertial measurement unit, in accordance with embodiments of the disclosure.
Figure 22:
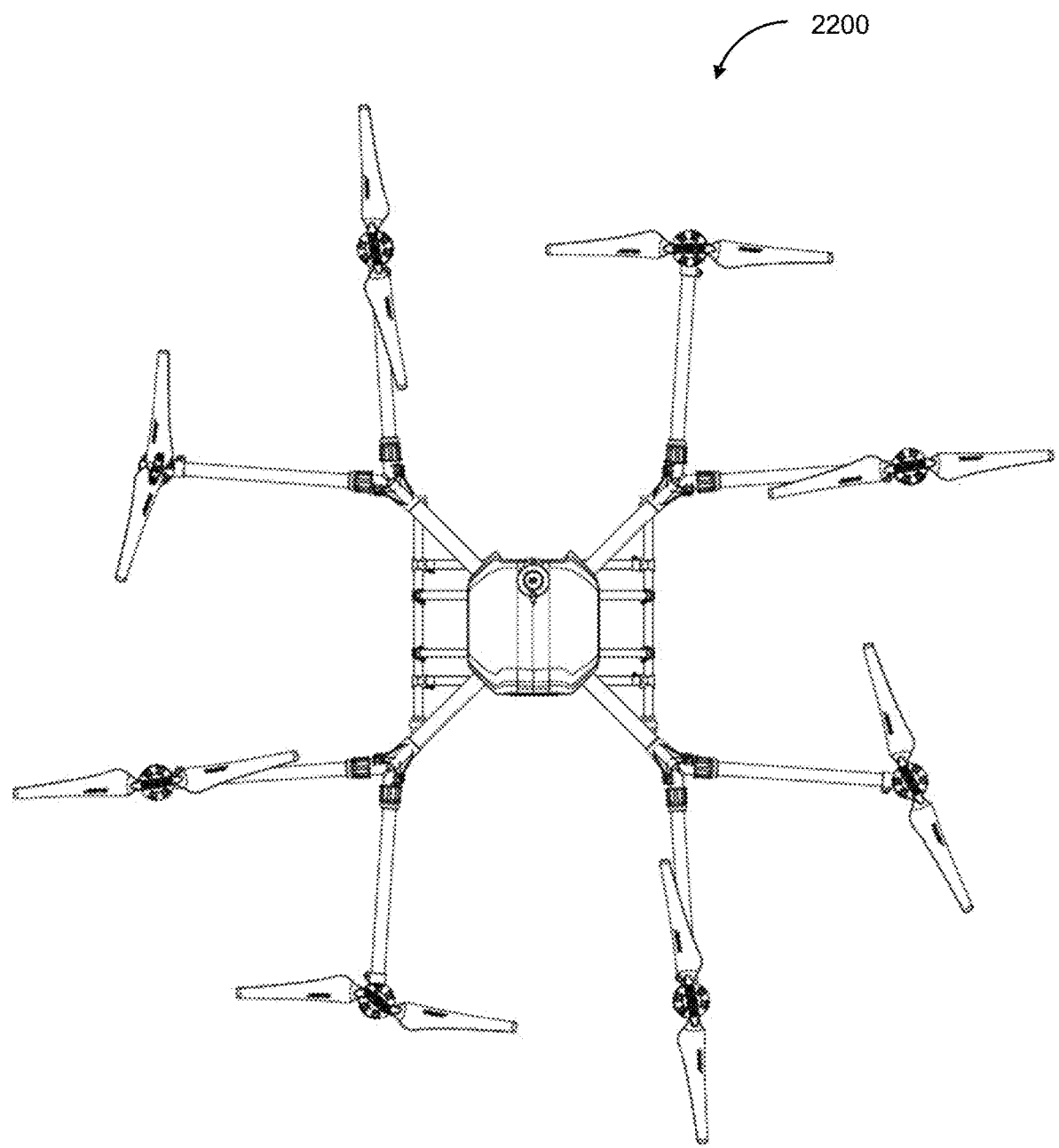
FIG. 22 illustrates a top view of an unmanned aerial vehicle having an inertial measurement unit, in accordance with embodiments of the disclosure.
Figure 23:
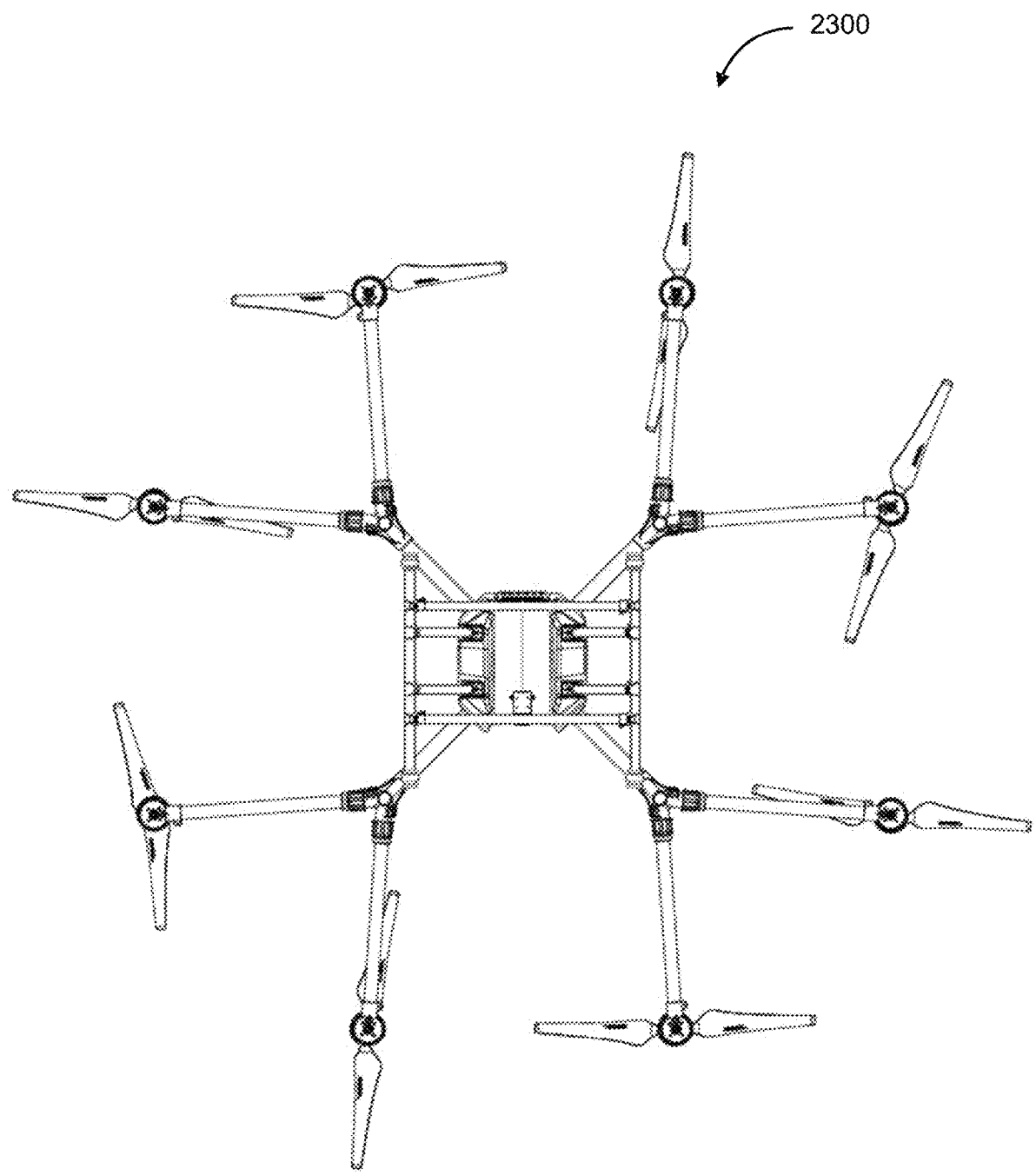
FIG. 23 illustrates a bottom view of an unmanned aerial vehicle having an inertial measurement unit, in accordance with embodiments of the disclosure.
Figure 24:
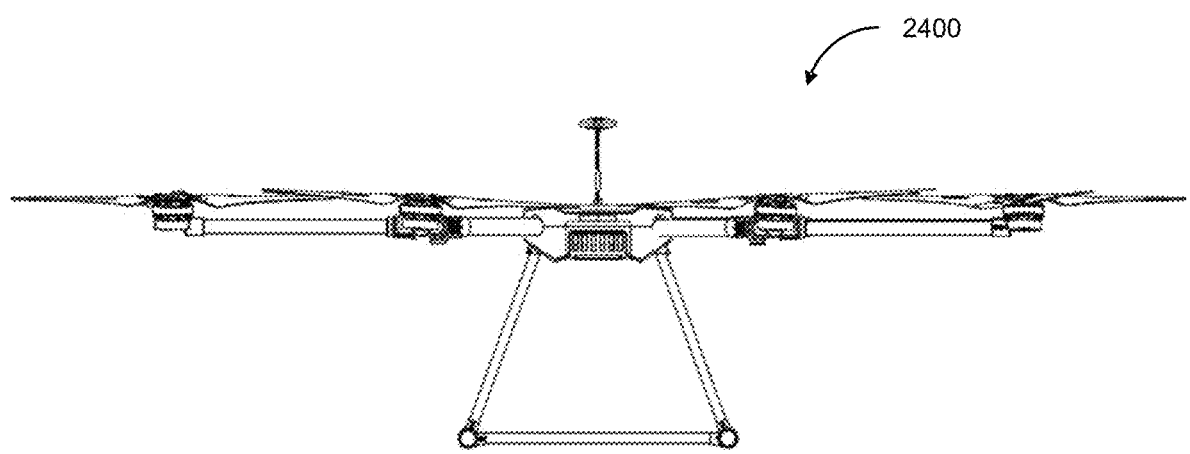
FIG. 24 illustrates a back view of an unmanned aerial vehicle having an inertial measurement unit, in accordance with embodiments of the disclosure.

FIG. 6 illustrates a front view of an upper portion 600 of a UAV housing, in accordance with embodiments of the disclosure. FIG. 7 illustrates a front view of a lower portion 700 of a UAV housing, in accordance with embodiments of the disclosure. FIG. 8 illustrates a front view of an inertial measurement unit (IMU) 800, in accordance with embodiments of the disclosure. FIG. 9 illustrates a front view of a lower cover 900 for IMU placement, in accordance with embodiments of the disclosure. FIG. 20 illustrates a front view of an unmanned aerial vehicle (UAV) 2000 having the inertial measurement unit (IMU) 800 disposed within the housing of the UAV after the upper portion 600 and lower portion 700 are assembled together, in accordance with embodiments of the disclosure.

Referring to FIGS. 6, 7, 8, 9, and 20, the inertial measurement unit (IMU) 800 may be placed within the lower portion 700 of a housing of the unmanned aerial vehicle (UAV) with the lower cover 900. The lower cover may be used to protect the IMU from external contaminants. The lower cover may be sealed. The lower cover may be dustproof. The lower cover may be waterproof. The upper portion 600 may be assembled to the lower portion 700 via a locking protrusion located at a center region of the lower portion 700, so as to form the UAV 2000 depicted in FIG. 20.

Figure 10:
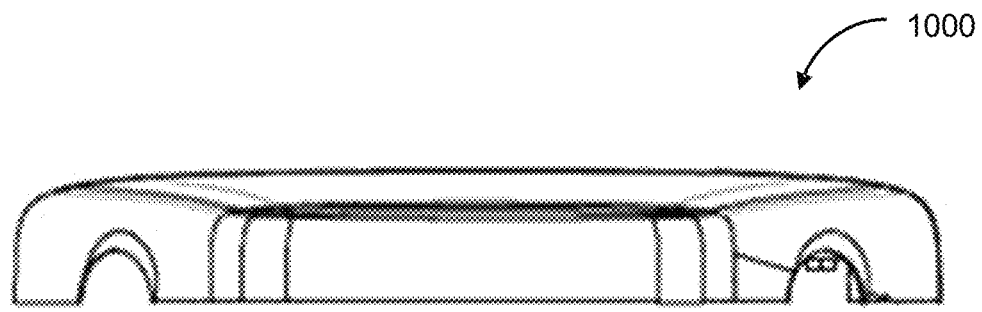
FIG. 10 illustrates a side view of an upper portion of a UAV housing, in accordance with embodiments of the disclosure.
Figure 14:
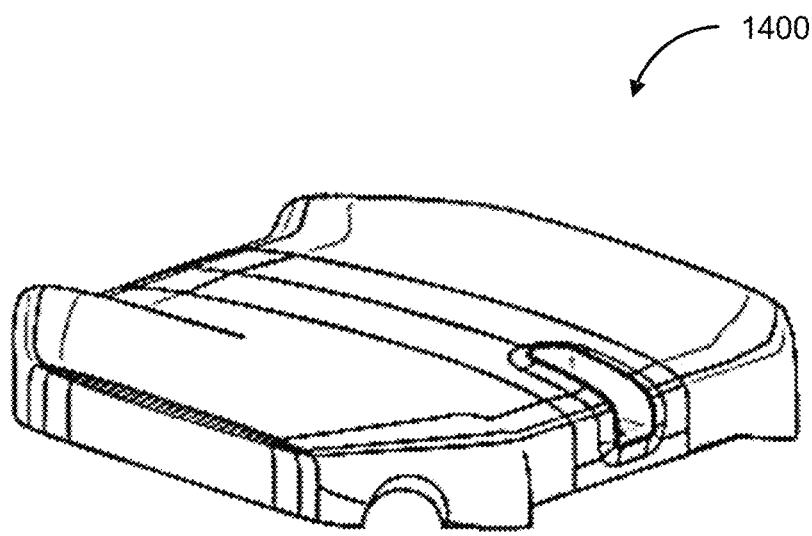
FIG. 14 illustrates a perspective view of an upper portion of a UAV housing, in accordance with embodiments of the disclosure.

FIG. 10 illustrates a side view of an upper portion 1000 of a UAV housing, and FIG. 14 illustrates a perspective view of an upper portion 1400 of a UAV housing, in accordance with embodiments of the disclosure. In some embodiments, the upper portion 1000 of FIG. 10 may be the same as the upper portion 600 of FIG. 6 and the upper portion 1400 of FIG. 14.

Figure 11:
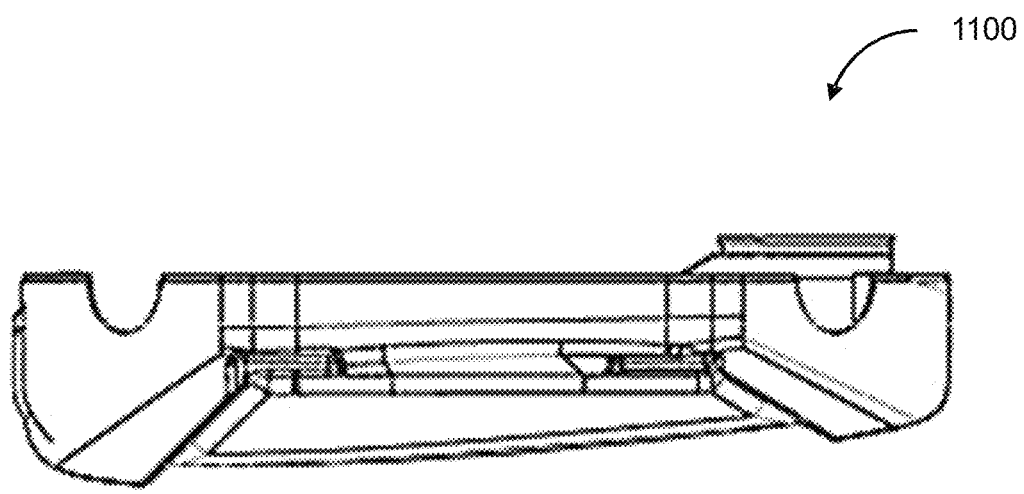
FIG. 11 illustrates a side view of a lower portion of a UAV housing, in accordance with embodiments of the disclosure.
Figure 15:
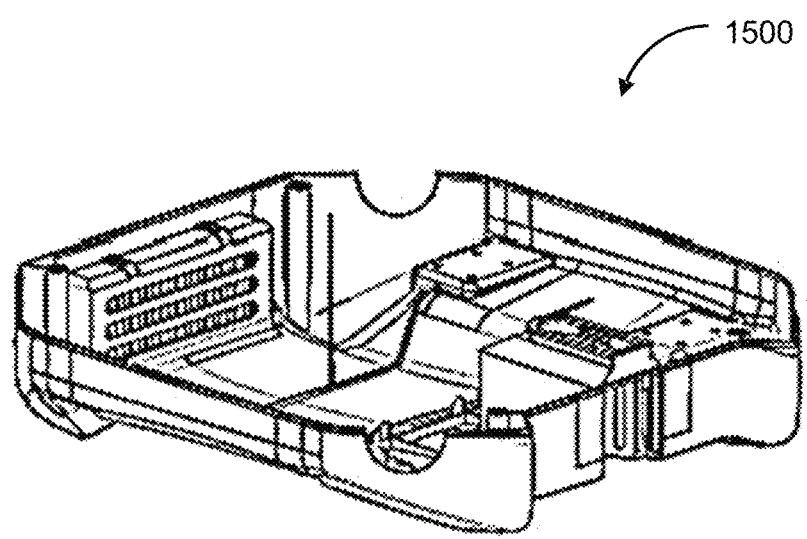
FIG. 15 illustrates a perspective view of a lower portion of a UAV housing, in accordance with embodiments of the disclosure.
Figure 16:
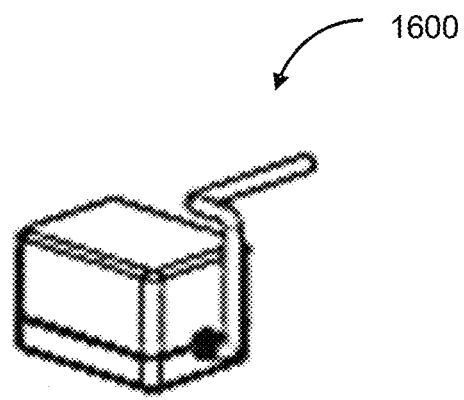
FIG. 16 illustrates a perspective view of an inertial measurement unit (IMU), in accordance with embodiments of the disclosure.
Figure 17:
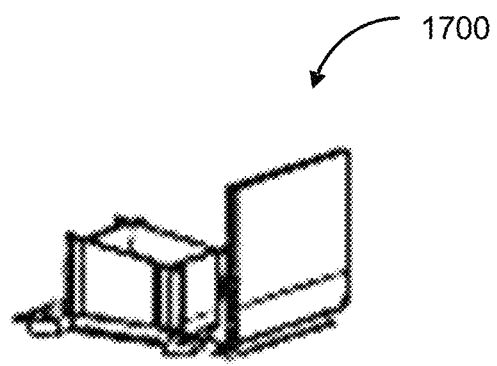
FIG. 17 illustrates a perspective view of a lower cover for IMU placement, in accordance with embodiments of the disclosure.

FIG. 11 illustrates a side view of a lower portion 1100 of a UAV housing, and FIG. 15 illustrates a perspective view of a lower portion 1500 of a UAV housing, in accordance with embodiments of the disclosure. In some embodiments, the lower portion 1100 of FIG. 11 may be the same as the lower portion 700 of FIG. 7 and the lower portion 1500 of FIG. 15.

Figure 12:
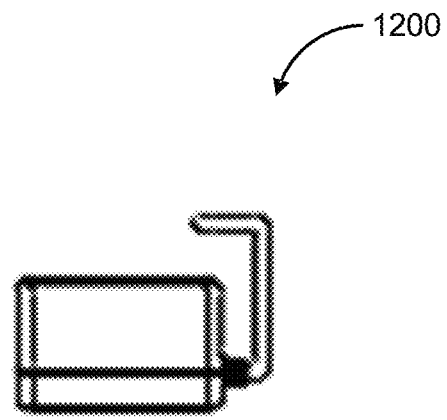
FIG. 12 illustrates a side view of an inertial measurement unit (IMU), in accordance with embodiments of the disclosure.
Figure 13:
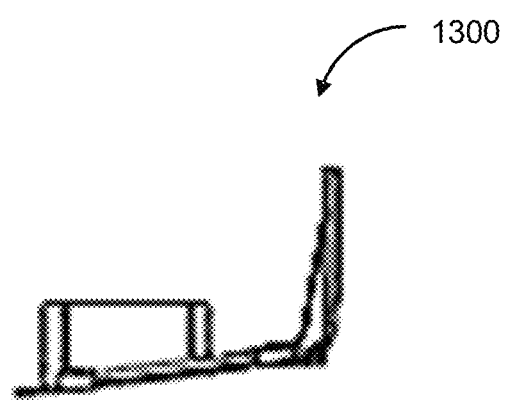
FIG. 13 illustrates a side view of a lower cover for IMU placement, in accordance with embodiments of the disclosure.

FIG. 12 illustrates a side view of an inertial measurement unit (IMU) 1200, in accordance with embodiments of the disclosure. In some embodiments, inertial measurement unit (IMU) 800 of FIG. 8 may be the same as the inertial measurement unit (IMU) 1200 of FIG. 12. FIG. 13 illustrates a side view of a lower cover 1300 for IMU placement, in accordance with embodiments of the disclosure. In some embodiments, lower cover 900 for IMU placement of FIG. 9 may be the same as the lower cover 1300 for IMU placement of FIG. 13.

Figure 18:
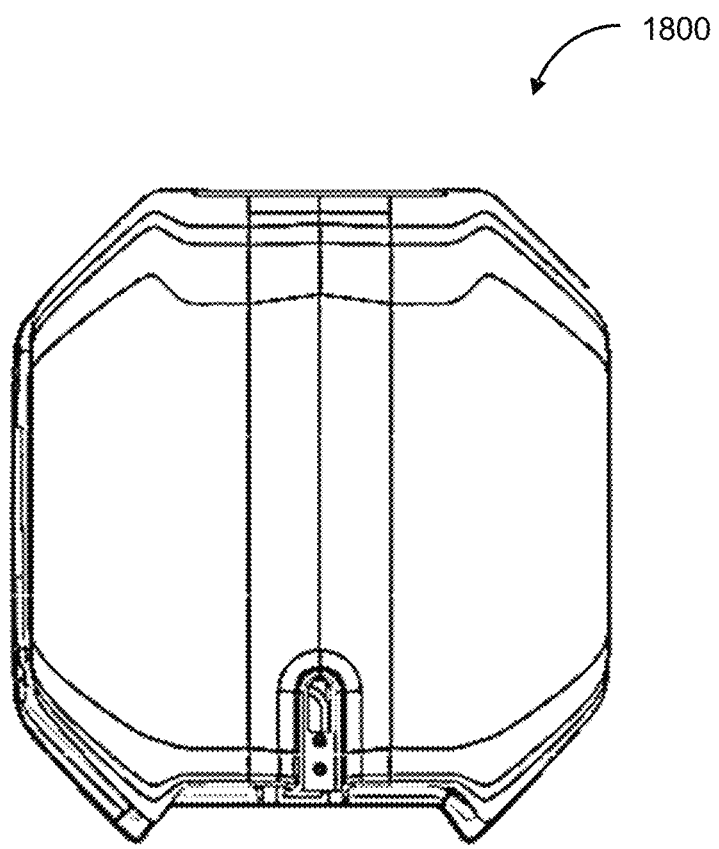
FIG. 18 illustrates a top view of an unmanned aerial vehicle (UAV) housing, in accordance with embodiments of the disclosure.
Figure 19:
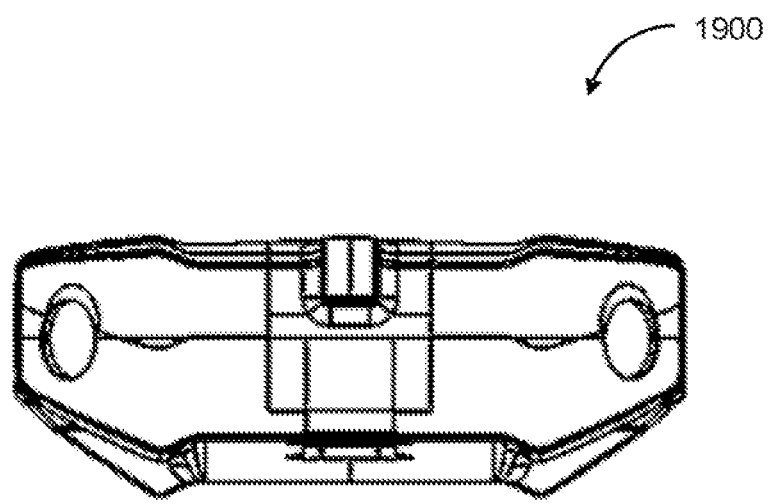
FIG. 19 illustrates a front view of an unmanned aerial vehicle (UAV) having an inertial measurement unit (IMU) disposed within the housing of the UAV, in accordance with embodiments of the disclosure.

FIG. 18 illustrates a top view of an unmanned aerial vehicle (UAV) 1800 having an inertial measurement unit (IMU), such as IMU 1200, disposed within the housing of the UAV after the upper portion 600 and lower portion 700 are assembled together, in accordance with embodiments of the disclosure. FIG. 19 illustrates a front view of an unmanned aerial vehicle (UAV) 1900 having an inertial measurement unit (IMU), such as IMU 1300, disposed within the housing of the UAV after the upper portion 600 and lower portion 700 are assembled together, in accordance with embodiments of the disclosure.

Referring to FIGS. 10 through 19, the inertial measurement unit (IMU) 1200 may be placed within the lower portion 1100 (or lower portion 1500) of a housing of the unmanned aerial vehicle (UAV) with the lower cover 1300. The lower cover may be used to protect the IMU from external contaminants. The lower cover may be sealed. The lower cover may be dustproof. The lower cover may be waterproof. The upper portion 1000 (or upper portion 1400) may be assembled to the lower portion 1100 (or lower portion 1500) via a locking protrusion located at an edge region of the lower portion 1100 (or lower portion 1500), so as to form the UAV 1800 depicted in FIG. 18 or the UAV 1900 depicted in FIG. 19. As shown in FIG. 18, the cutouts in the upper portion 1000 (or upper portion 1400) are aligned to the cutouts in the lower portion 1100 (or lower portion 1500) post-assembly.

FIGS. 21 through 24 illustrate different views of an unmanned aerial vehicle having an inertial measurement unit, in accordance with embodiments of the disclosure. Specifically, FIGS. 21, 22, 23, and 24 respectively illustrate a perspective view 2100, a top view 2200, a front view 2300, and a back view 2400 of the unmanned aerial vehicle having the inertial measurement unit.

Figure 25:
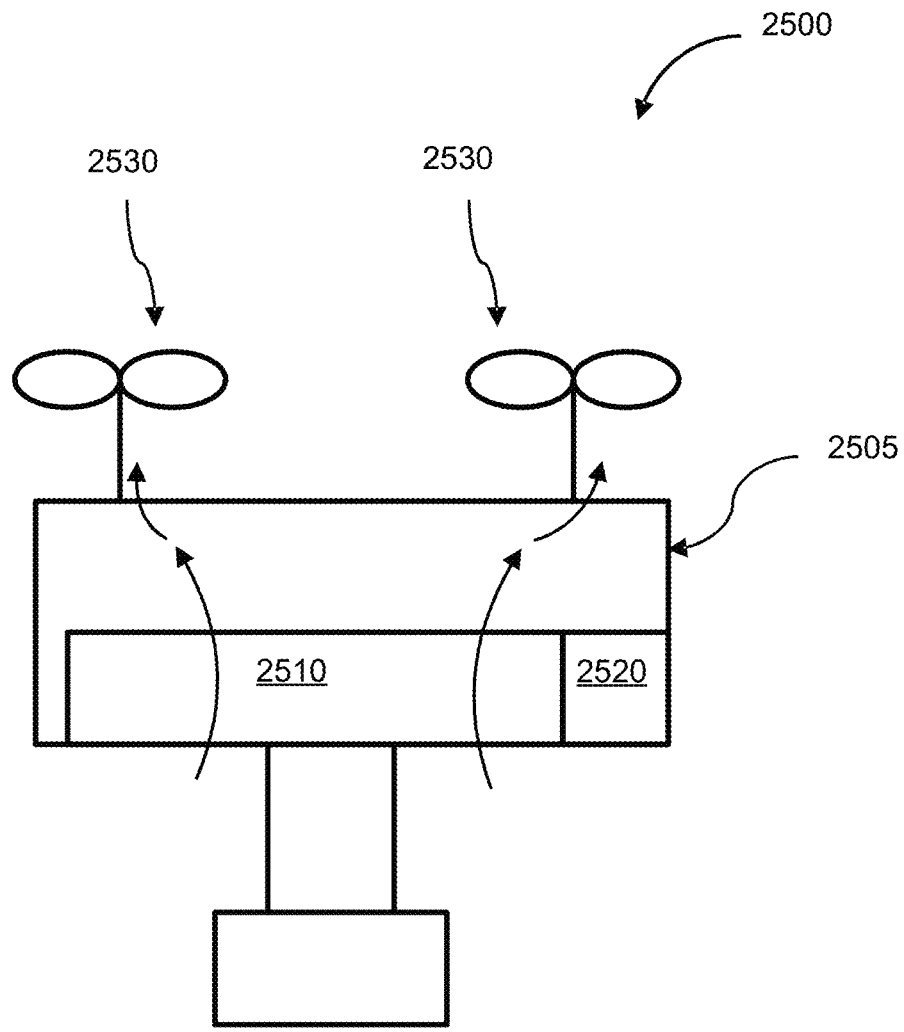
FIG. 25 illustrates air flow through an unmanned aerial vehicle (UAV) that has moving rotors, in accordance with embodiments of the disclosure.

FIG. 25 illustrates air flow through an unmanned aerial vehicle (UAV) 2500 that has moving rotors 2530, in accordance with embodiments of the disclosure. The UAV as provided in FIG. 25 has a first compartment 2510 and a second compartment 2520. The first compartment and the second compartment are within housing 2505. The housing may partially or completely enclose one or more components of the UAV. The housing may form the central body of the UAV. The housing may form an enclosure of the central body. The housing may or may not form the arms or a portion of the arms. The housing may or may not form an enclosure of the arms. In some embodiments, the arms may be separably attached to the central body. Alternatively, the arms may be affixed to the central body, or may be integrally formed with the central body. A housing may be formed of a single piece or multiple pieces. The housing may form a single integral piece for the central body and/or the arms. Alternatively, the housing may be a single integral piece for the central body while the arms are formed from separate pieces. In some instances, the housing may be formed as multiple pieces for the central body. The housing may be formed as multiple pieces for the central body and the arms. In some instances, the housing may form a shell or cover that may enclose one or more components.

The housing may define an interior space or cavity. The interior space or cavity may be in communication with exhaust fans that are associated with motors of the UAV. The interior space or cavity may contain one or more electrical components of the UAV. For example, the flight control unit may be provided within the interior space or cavity of the housing. Other examples of components that may be within the interior cavity may include sensors, navigation units (e.g., global positioning system (GPS), inertial measurement unit (IMU), communication units (e.g., for direct or indirect forms of communication), image processing units, payload data or control units, power control units, or any other type of components. For instance, a power source that may power the UAV may be provided within an interior space or cavity. The housing may encompass or enclose one or more of these components.

The engaging of the exhaust fans that are in communication with the interior space or cavity may generate an internal airflow within the UAV. In particular, the use of the exhaust fans may draw in ambient air from an outside source. As such, an increase of airflow through the exhaust fans increases the airflow through the UAV, which in turn may increase the negative pressure that is generated within the housing of the UAV. Accordingly, the engagement of the exhaust fans may have an adverse effect on one or more sensors that measure barometric pressure, such as an IMU. Additionally, other components that help to operate the UAV may be used within the interior space or cavity. In placing an IMU so as to be isolated from adverse airflow within a UAV, the IMU may be placed in an area or compartment that is isolated from the exhaust fans and one or more electrical components that have a negative effect on the internal airflow of the UAV.

Figure 26:
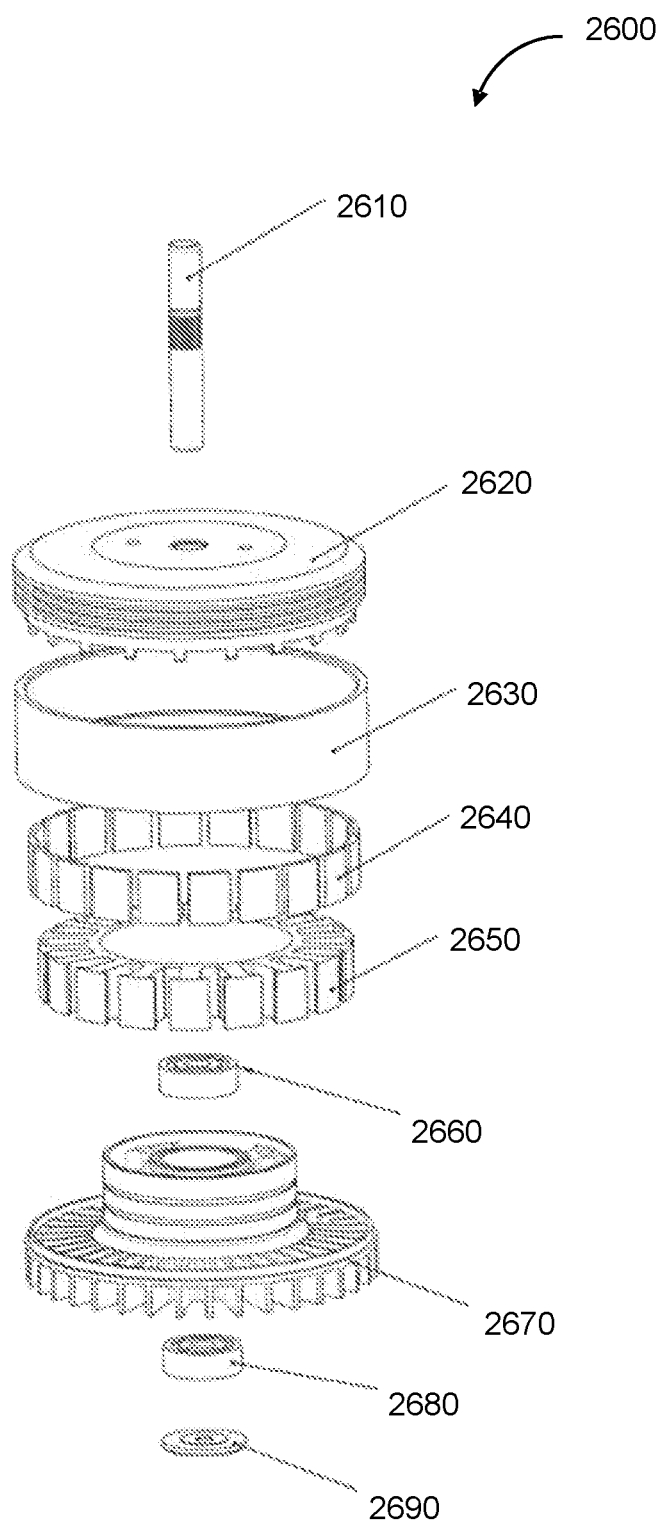
FIG. 26 illustrates an exploded view of a motor that is used in an unmanned aerial vehicle (UAV), in accordance with an embodiment of the disclosure.
Figure 27:
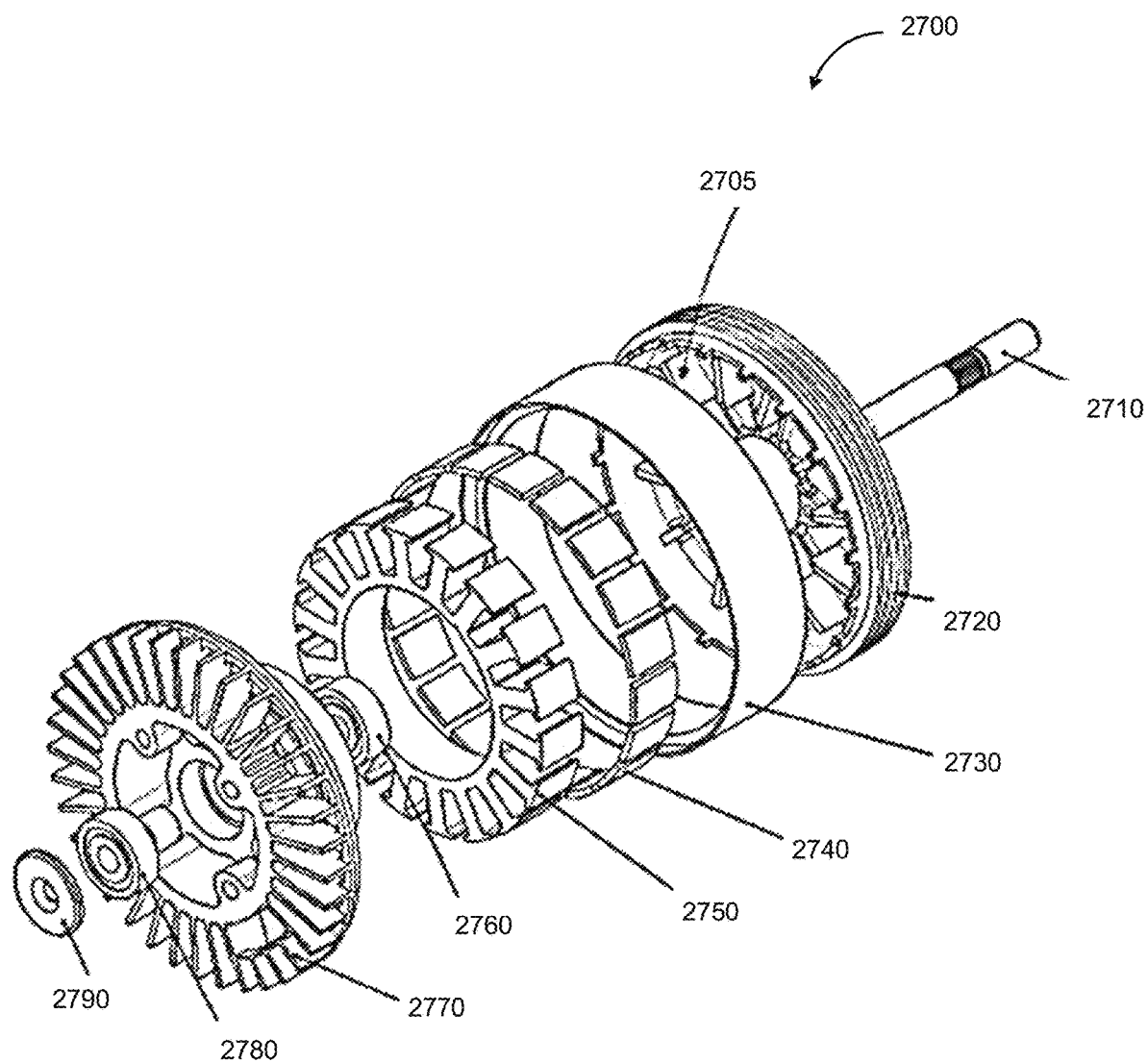
FIG. 27 illustrates a perspective exploded view of a motor that is used in an unmanned aerial vehicle (UAV), in accordance with an embodiment of the disclosure.
Figure 28:
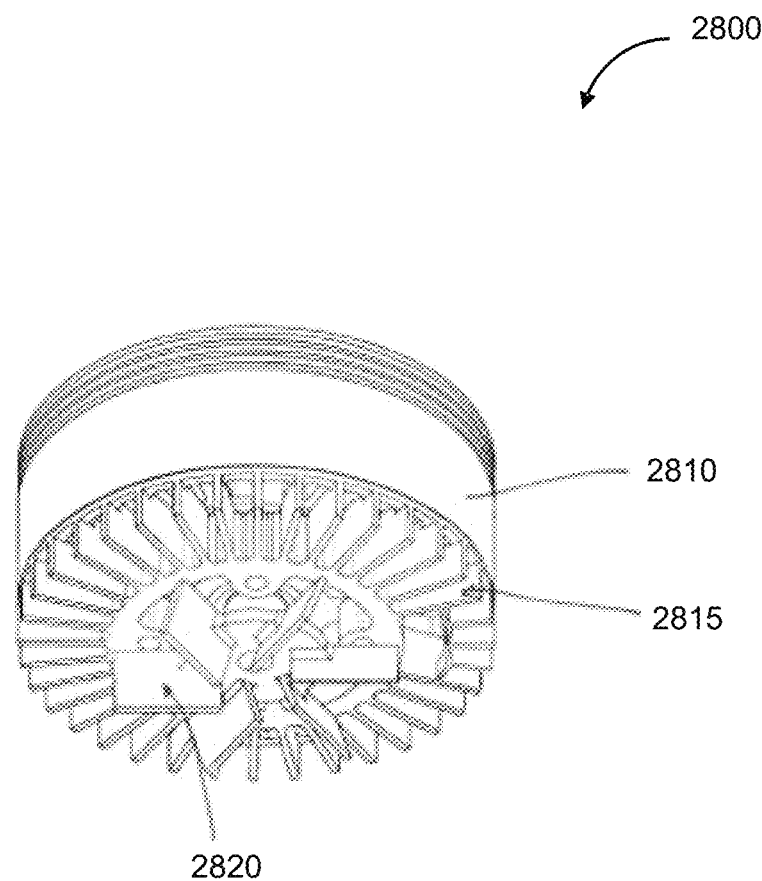
FIG. 28 illustrates a perspective view of a motor cover that is used in an unmanned aerial vehicle (UAV), in accordance with an embodiment of the disclosure.

FIGS. 26-28 depict embodiments of a motor that may be used in an unmanned aerial vehicle (UAV). The UAV using the motor may have an IMU that is isolated from an internal region of a housing of the UAV that is exposed to internal airflow. FIG. 26 illustrates an exploded view of a motor that may be used in an unmanned aerial vehicle (UAV), in accordance with an embodiment of the disclosure. As such, FIG. 26 shows the relationship between components 2610-2690 within a motor 2600. In particular, FIG. 26 illustrates a motor axis 2610 which is physically connected to an upper cover 2620 of the motor 2600. The upper cover of the motor is coupled to a magnet yoke 2630. The magnet yoke surrounds a permanent magnet 2640 and a coil yoke 2650, which in turn surround a bearing 2660 that sits within a motor base 2670. A second bearing 2680 sits below the motor base and is guarded by a bearing end cap 2690.

FIG. 27 illustrates a perspective exploded view of a motor that is used in an unmanned aerial vehicle (UAV), in accordance with an embodiment of the disclosure. In particular, FIG. 27 illustrates a first motor 2700 having blades within an upper cover. FIG. 27 illustrates a motor having auxiliary blades for airflow. Similar to FIG. 26, FIG. 27 shows the relationship between components 2705-2790 within a motor 2700. In particular, FIG. 27 illustrates a motor axis 2710 which is physically connected to an upper cover of the motor 2720. The upper cover of the motor has auxiliary blades 2705 that are mounted on an inner surface of the upper cover and may be used to increase airflow through the motor. In particular, a plurality of auxiliary blades are provided at the motor upper cover to generate airflow. Additionally, the motor of FIG. 27 rotates together with the motor axis.

The motor may be used in a UAV. Airflow that passes through the motor comes from within the UAV, in particular from the UAV body. The UAV body draws in ambient air from an outside source. As such, an increase of airflow through the motor increases the airflow through the UAV, which in turn would increase the negative pressure that is generated within the housing of the UAV. Similar to FIG. 26, the upper cover of the motor is coupled to a magnet yoke 2730. The magnet yoke surrounds a permanent magnet 2740 and a coil yoke 2750, which in turn surround a bearing 2760 that sits within a motor base 2770. A second bearing 2780 sits below the motor base and is guarded by a bearing end cap 2790.

FIG. 28 illustrates a perspective view of a motor cover that is used in an unmanned aerial vehicle (UAV), in accordance with an embodiment of the disclosure. In particular, FIG. 28 illustrates an upper cover of the motor 2810 having blades 2815 and an additional fan 2820 coupled to the upper cover of the motor 2810. In particular, blades 2815 and the additional fan 2820 may be physically coupled to the upper cover of the motor 2810. Blades 2815 may extend from a base component that is physically coupled to the upper cover of the motor 2810. Similarly, additional fan 2820 may extend from a second base component that is physically coupled to the upper cover of the motor 2810. Additionally, the blades 2815 and the additional fan 2820 may provide additional airflow through the UAV. As airflow passes through the main body of the UAV, an increase of airflow through the motor increases the airflow through the UAV, which in turn would increase the negative pressure that is generated within the housing of the UAV.

Figure 29:
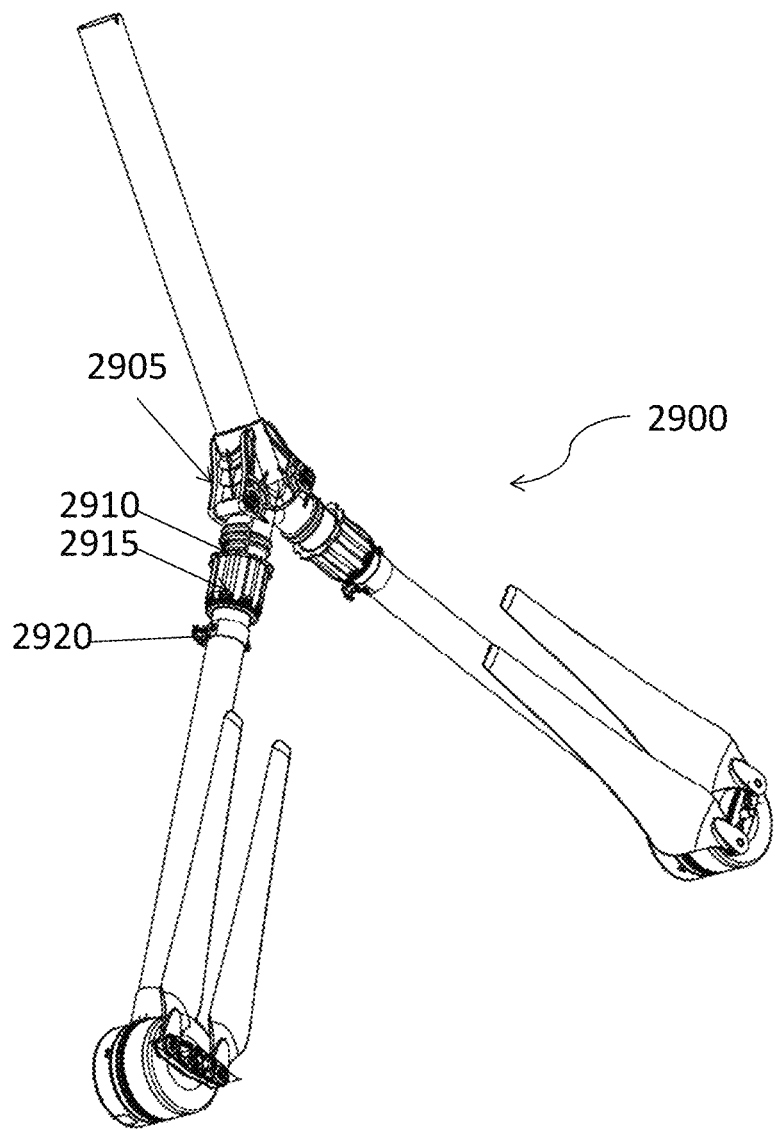
FIG. 29 illustrates a Y-shaped arm of an unmanned aerial vehicle (UAV), in accordance with an embodiment of the disclosure.

FIG. 29 illustrates a Y-shaped arm 2900 of an unmanned aerial vehicle (UAV), in accordance with an embodiment of the disclosure. In some cases, the arm can be detachable from the UAV, and the Y-shaped arm 2900 is foldable. Additional and/or replacement arms can be provided separately from the UAV. Arms can be provided for purchase separate from the UAV. During use one or more of the arms on the UAV can become damaged. The arm can be replaced with a new arm without needing to replace the entire UAV. The Y-shaped arm 2900 includes a stem portion and two branch portions connected to the stem by a joint 2905. The stem portion and branch portions are hollow. Interior spaces between the stem portion and the branch portions communicate with each other. One end of the stem portion is connected to and communicates with the housing and the other end of the stem portion is connected to the joint 2905. Additionally, operation of one or more Y-shaped arms may affect conditions within the central body. In particular, the one or more Y-shaped arms may communicate with the first component of the central body. Further, a portion of air flow into the central body may be generated by the one or more Y-shaped arms.

The arm can be segmented by the joint 2905. The joint can connect to the stem portion on a proximal end of the joint. The joint can connect to one or more branch portions on a distal end of the joint. The distal end of the joint can comprise one or more connection regions 2910 for connecting to one or more branch portions. Each connecting region can comprise a pivot region that permits a branch portion connected to the connection region to pivot about an axis with respect to the stem portion when the branch is connected to the connection region. A first connecting region can comprise a first pivot region that allows a first branch portion to pivot about an axis with respect to the stem portion. A second connecting region can comprise a second pivot region that allows a second branch portion to pivot about an axis with respect to the stem portion.

The joint can comprise a locking mechanism configured to lock one or more branch portions in predetermined position relative to the stem portion. Locking the one or more branch portions relative to the stem portion can permit the UAV to maintain stability during locomotion (e.g., flight). The locking mechanism can lock one or more branch portions in predetermined position relative to the stem portion when the UAV is in an extended state. The locking mechanism can lock one or more branch portions in predetermined position relative to the stem portion when the UAV is in a compacted state.

The locking mechanism can be a threaded locking mechanism. Alternatively the locking mechanism can comprise a pin locking mechanism. The pin can pass through a branch portion and a corresponding stem portion. When a threaded locking mechanism is used, the threaded locking mechanism can include a threaded sleeve 2915. The sleeve can be provided on the branch and a threaded extension on the joint. The threaded sleeve can comprise a cap with an inner threaded surface. The threaded sleeve can be permanently attached to the branch portion. The threaded sleeve can be an open cylindrical tube with a threaded interior. The threaded sleeve can be a female half of a threaded connection.

The threaded extension can be a tubular extension that protrudes from the joint. The threaded extension can have a threaded outer surface. The threaded extension can be a male half of a threaded connection. The threaded sleeve can be fitted over at least a portion of the branch. In an unlocked position the threaded sleeve can slide along the branch. The threaded sleeve can spin around the branch. The threaded sleeve can translate a long a longitudinal axis of the branch. In some cases, a clamp 2920 can be provided on the branch to restrict movement of the sleeve to a fraction of the branch. The clamp can prevent the sleeve from sliding along the entire length of the branch while the branch is unlocked from the stem. Sliding of the sleeve along the length of the branch can scratch and/or damage the branch. In some cases, a bothersome noise can be generated by the sliding of the sleeve along the length of the branch.

The branch can be locked in a position relative to the stem by aligning the branch portion with the threaded extension of the joint. When the branch portion is aligned with the threaded extension of the joint a terminal end of the branch and a terminal end of the threaded extension can be flush with one another. When the branch portion is aligned with the threaded extension of the joint, a terminal end of the branch can be fitted inside of a terminal end of the threaded extension. When the branch portion is aligned with the threaded extension of the joint, a terminal end of the branch can be fitted over the terminal end of the threaded extension. Once the branch portion is aligned with the threaded extension of the joint, the threaded sleeve can be rotated to form a threaded connection between the sleeve and the extension. When the threaded connection is formed movement of the branch relative to the stem may not be permitted. The sleeve can isolate an inner portion of the joint from an ambient environment. The sleeve can prevent dust and/or water from contacting the inner portion of the joint. The sleeve can form a water tight and/or air tight seal around the inner portion of the joint.

The systems, devices, and methods described herein can be applied to a wide variety of movable objects. As previously mentioned, any description herein of an aerial vehicle, such as a UAV, may apply to and be used for any movable object. Any description herein of an aerial vehicle may apply specifically to UAVs. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be an aerial vehicle. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). An aerial vehicle can be self-propelled, such as self-propelled through the air. A self-propelled aerial vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. The movable object may be controlled remotely via an occupant within a separate vehicle. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$3, 1 m$^3$, or 10 m$^3$. Conversely, the total volume of the movable object may be greater than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail elsewhere herein. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 30:
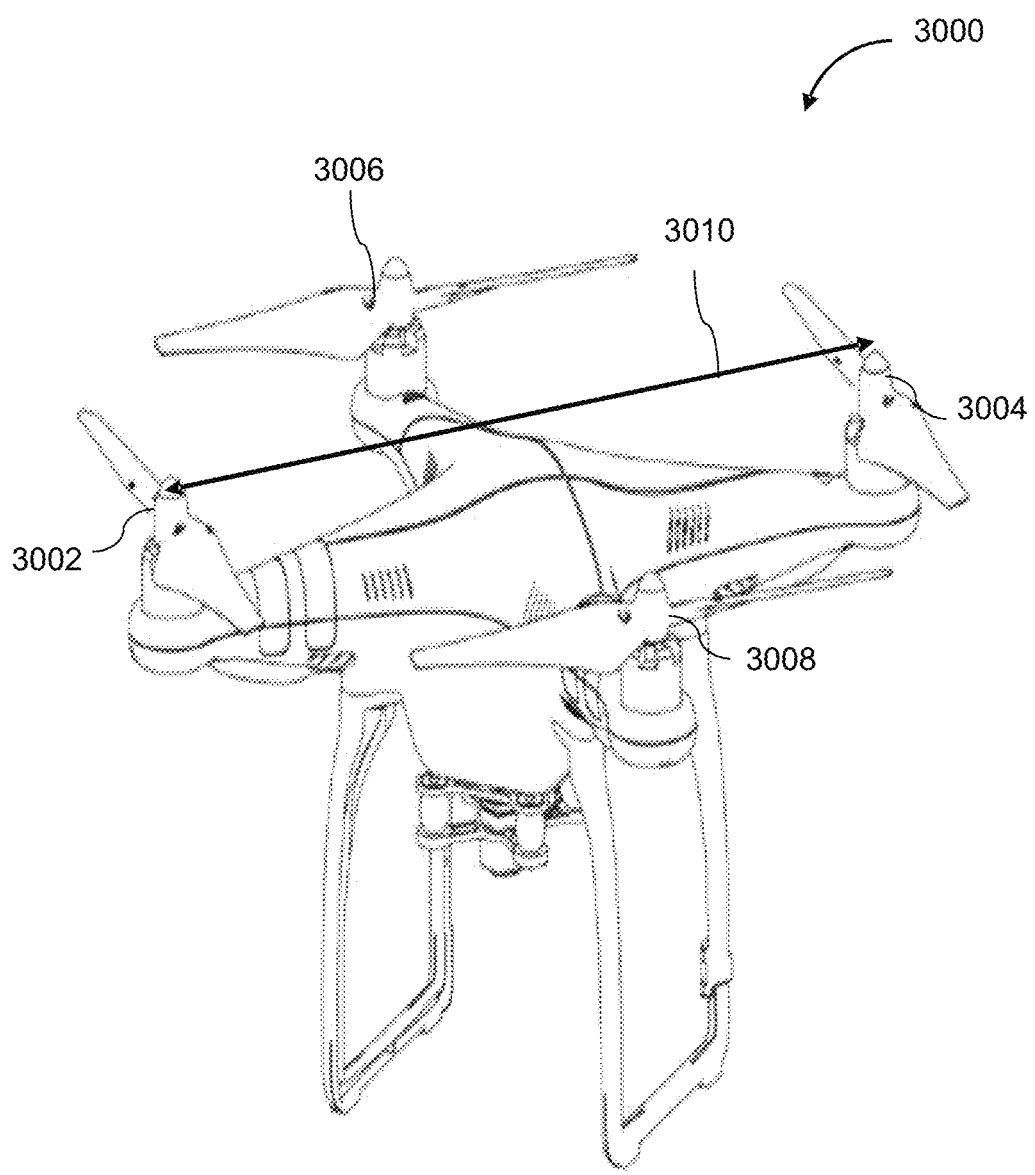
FIG. 30 illustrates an unmanned aerial vehicle, in accordance with an embodiment of the disclosure.

FIG. 30 illustrates an unmanned aerial vehicle (UAV) 3000, in accordance with embodiments of the present disclosure. The UAV may be an example of a movable object as described herein. The UAV 3000 can include a propulsion system having four rotors 3002, 3004, 3006, and 3008. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 410. For example, the length 3010 can be less than or equal to 2 m, or less than equal to 5 m. In some embodiments, the length 3010 can be within a range from 40 cm to 1 m, from 10 cm to 2 m, or from 5 cm to 5 m. Any description herein of a UAV may apply to a movable object, such as a movable object of a different type, and vice versa. The UAV may use an assisted takeoff system or method as described herein.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object). The load can include a payload and/or a carrier, as described elsewhere herein.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 31:
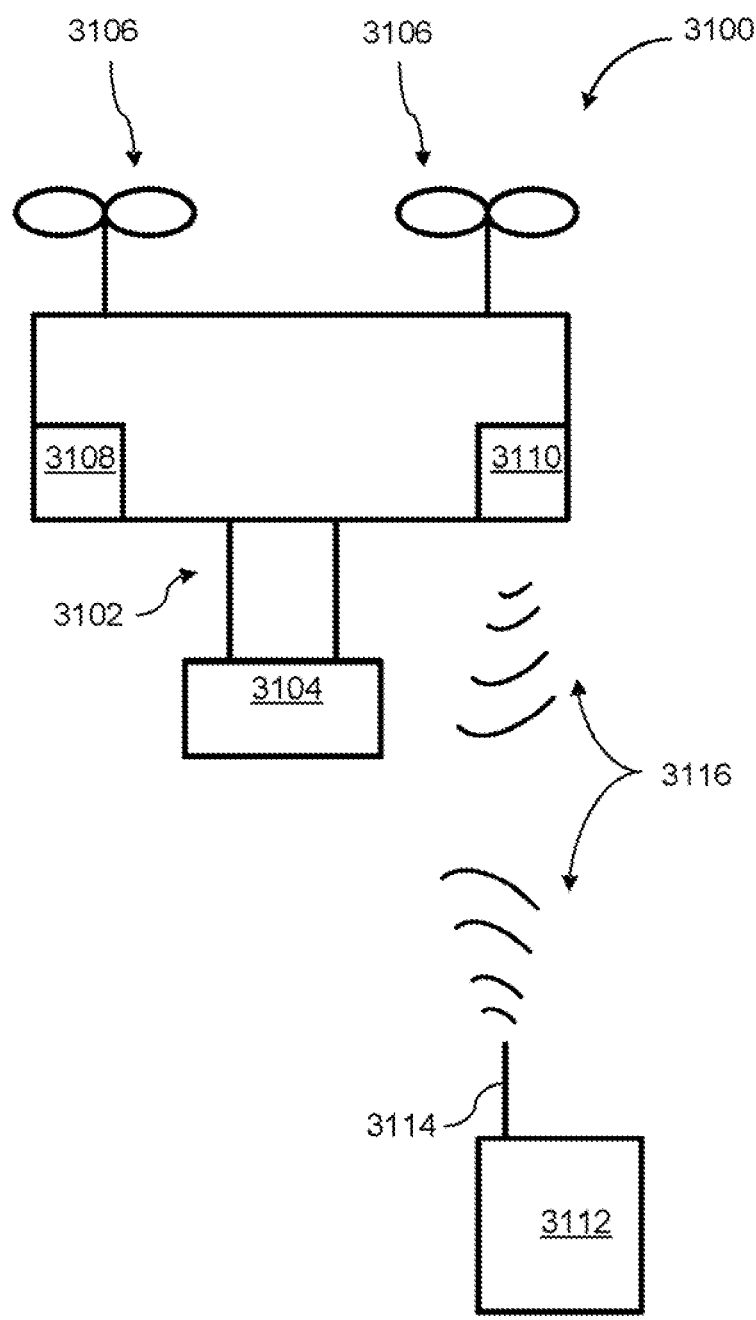
FIG. 31 illustrates a movable object including a carrier and a payload, in accordance with an embodiment of the disclosure.

FIG. 31 illustrates a movable object 3100 including a carrier 3102 and a payload 3104, in accordance with embodiments. Although the movable object 3100 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 3104 may be provided on the movable object 3100 without requiring the carrier 3102. The movable object 3100 may include propulsion mechanisms 3106, a sensing system 3108, and a communication system 3110.

The propulsion mechanisms 3106 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 3106 can be mounted on the movable object 3100 using any suitable means, such as a support element (e.g., a drive shaft) as described elsewhere herein. The propulsion mechanisms 3106 can be mounted on any suitable portion of the movable object 3100, such on the top, bottom, front, back, sides, or suitable combinations thereof.

In some embodiments, the propulsion mechanisms 3106 can enable the movable object 3100 to take off vertically from a surface or land vertically on a surface without requiring any horizontal movement of the movable object 3100 (e.g., without traveling down a runway). Optionally, the propulsion mechanisms 3106 can be operable to permit the movable object 3100 to hover in the air at a specified position and/or orientation. One or more of the propulsion mechanisms 3100 may be controlled independently of the other propulsion mechanisms. Alternatively, the propulsion mechanisms 3100 can be configured to be controlled simultaneously. For example, the movable object 3100 can have multiple horizontally oriented rotors that can provide lift and/or thrust to the movable object. The multiple horizontally oriented rotors can be actuated to provide vertical takeoff, vertical landing, and hovering capabilities to the movable object 3100. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 3100 (e.g., with respect to up to three degrees of translation and up to three degrees of rotation).

The sensing system 3108 can include one or more sensors that may sense the spatial disposition, velocity, and/or acceleration of the movable object 3100 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 3108 can be used to control the spatial disposition, velocity, and/or orientation of the movable object 3100 (e.g., using a suitable processing unit and/or control module, as described below). Alternatively, the sensing system 3108 can be used to provide data regarding the environment surrounding the movable object, such as weather conditions, proximity to potential obstacles, location of geographical features, location of manmade structures, and the like.

The communication system 3110 enables communication with terminal 3112 having a communication system 3114 via wireless signals 3116. The communication systems 3110, 3114 may include any number of transmitters, receivers, and/or transceivers suitable for wireless communication. The communication may be one-way communication, such that data can be transmitted in only one direction. For example, one-way communication may involve only the movable object 3100 transmitting data to the terminal 3112, or vice-versa. The data may be transmitted from one or more transmitters of the communication system 3110 to one or more receivers of the communication system 3112, or vice-versa. Alternatively, the communication may be two-way communication, such that data can be transmitted in both directions between the movable object 3100 and the terminal 3112. The two-way communication can involve transmitting data from one or more transmitters of the communication system 3110 to one or more receivers of the communication system 3114, and vice-versa.

In some embodiments, the terminal 3112 can provide control data to one or more of the movable object 3100, carrier 3102, and payload 3104 and receive information from one or more of the movable object 3100, carrier 3102, and payload 3104 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 3106), or a movement of the payload with respect to the movable object (e.g., via control of the carrier 3102). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 3108 or of the payload 3104). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 3112 can be configured to control a state of one or more of the movable object 3100, carrier 3102, or payload 3104. Alternatively or in combination, the carrier 3102 and payload 3104 can also each include a communication module configured to communicate with terminal 3112, such that the terminal can communicate with and control each of the movable object 3100, carrier 3102, and payload 3104 independently.

In some embodiments, the movable object 3100 can be configured to communicate with another remote device in addition to the terminal 3112, or instead of the terminal 3112. The terminal 3112 may also be configured to communicate with another remote device as well as the movable object 3100. For example, the movable object 3100 and/or terminal 3112 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 3100, receive data from the movable object 3100, transmit data to the terminal 3112, and/or receive data from the terminal 3112. Optionally, the remote device can be connected to the Internet or other telecommunications network, such that data received from the movable object 3100 and/or terminal 3112 can be uploaded to a website or server.

Figure 32:
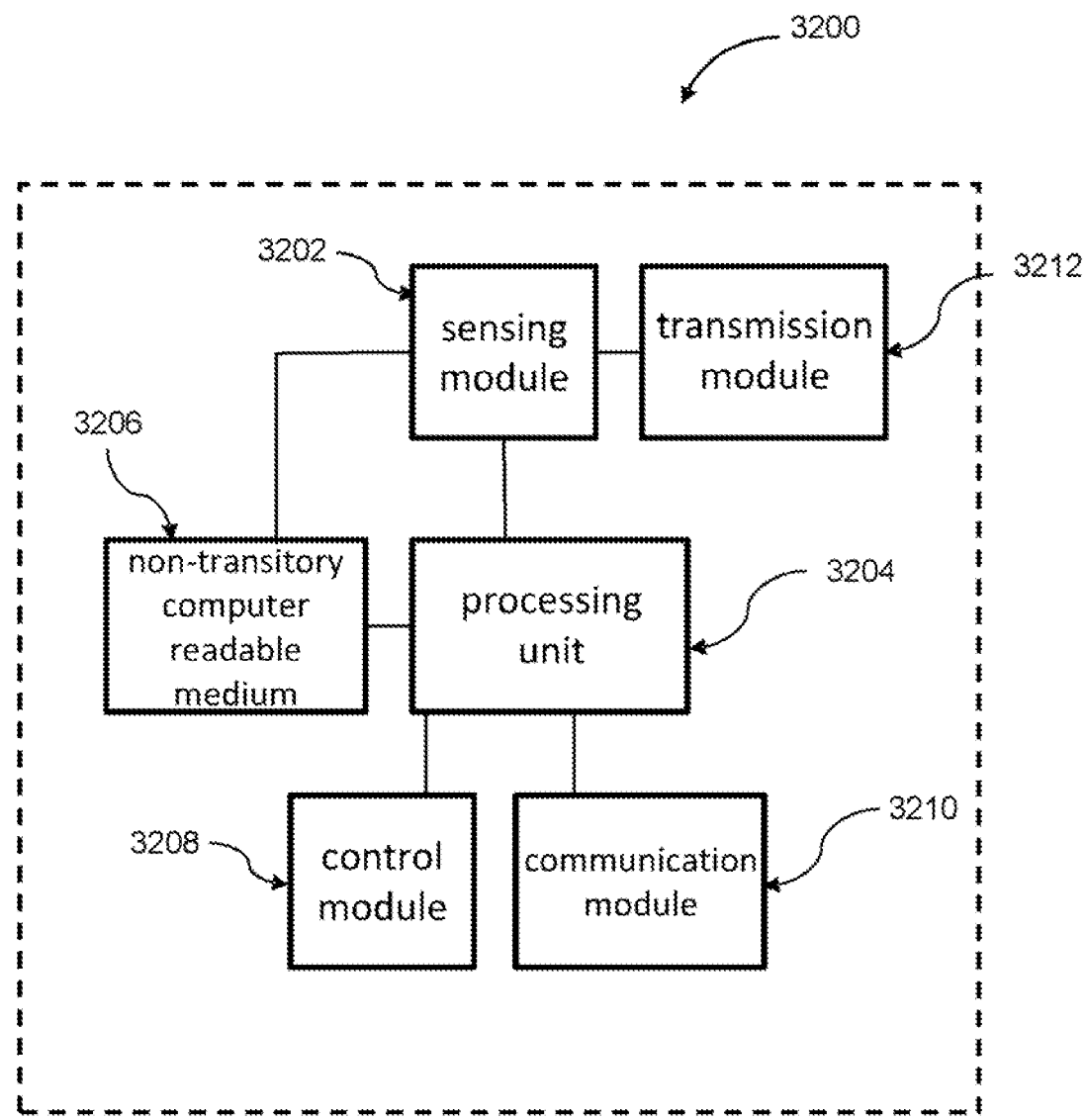
FIG. 32 is a schematic illustration by way of block diagram of a system for controlling a movable object, in accordance with an embodiment of the disclosure.

FIG. 32 is a schematic illustration by way of block diagram of a system 3200 for controlling a movable object, in accordance with embodiments. The system 3200 can be used in combination with any suitable embodiment of the systems, devices, and methods disclosed herein. The system 3200 can include a sensing module 3202, processing unit 3204, non-transitory computer readable medium 3206, control module 3208, and communication module 3210.

The sensing module 3202 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 3202 can be operatively coupled to a processing unit 3204 having a plurality of processors. In some embodiments, the sensing module can be operatively coupled to a transmission module 3212 (e.g., a Wi-Fi image transmission module) configured to directly transmit sensing data to a suitable external device or system. For example, the transmission module 3212 can be used to transmit images captured by a camera of the sensing module 3202 to a remote terminal.

The processing unit 3204 can have one or more processors, such as a programmable processor (e.g., a central processing unit (CPU)). The processing unit 3204 can be operatively coupled to a non-transitory computer readable medium 3206. The non-transitory computer readable medium 3206 can store logic, code, and/or program instructions executable by the processing unit 3204 for performing one or more steps. The non-transitory computer readable medium can include one or more memory units (e.g., removable media or external storage such as an SD card or random access memory (RAM)). In some embodiments, data from the sensing module 3202 can be directly conveyed to and stored within the memory units of the non-transitory computer readable medium 3206. The memory units of the non-transitory computer readable medium 3206 can store logic, code and/or program instructions executable by the processing unit 3204 to perform any suitable embodiment of the methods described herein. For example, the processing unit 3204 can be configured to execute instructions causing one or more processors of the processing unit 3204 to analyze sensing data produced by the sensing module. The memory units can store sensing data from the sensing module to be processed by the processing unit 3204. In some embodiments, the memory units of the non-transitory computer readable medium 3206 can be used to store the processing results produced by the processing unit 3204.

In some embodiments, the processing unit 3204 can be operatively coupled to a control module 3208 configured to control a state of the movable object. For example, the control module 3208 can be configured to control the propulsion mechanisms of the movable object to adjust the spatial disposition, velocity, and/or acceleration of the movable object with respect to six degrees of freedom. Alternatively or in combination, the control module 3208 can control one or more of a state of a carrier, payload, or sensing module.

The processing unit 3204 can be operatively coupled to a communication module 3210 configured to transmit and/or receive data from one or more external devices (e.g., a terminal, display device, or other remote controller). Any suitable means of communication can be used, such as wired communication or wireless communication. For example, the communication module 3210 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 3210 can transmit and/or receive one or more of sensing data from the sensing module 3202, processing results produced by the processing unit 3204, predetermined control data, user commands from a terminal or remote controller, and the like.

The components of the system 3200 can be arranged in any suitable configuration. For example, one or more of the components of the system 3200 can be located on the movable object, carrier, payload, terminal, sensing system, or an additional external device in communication with one or more of the above. Additionally, although FIG. 32 depicts a single processing unit 3204 and a single non-transitory computer readable medium 3206, one of skill in the art would appreciate that this is not intended to be limiting, and that the system 3200 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 3200 can occur at one or more of the aforementioned locations.

Figure 33:
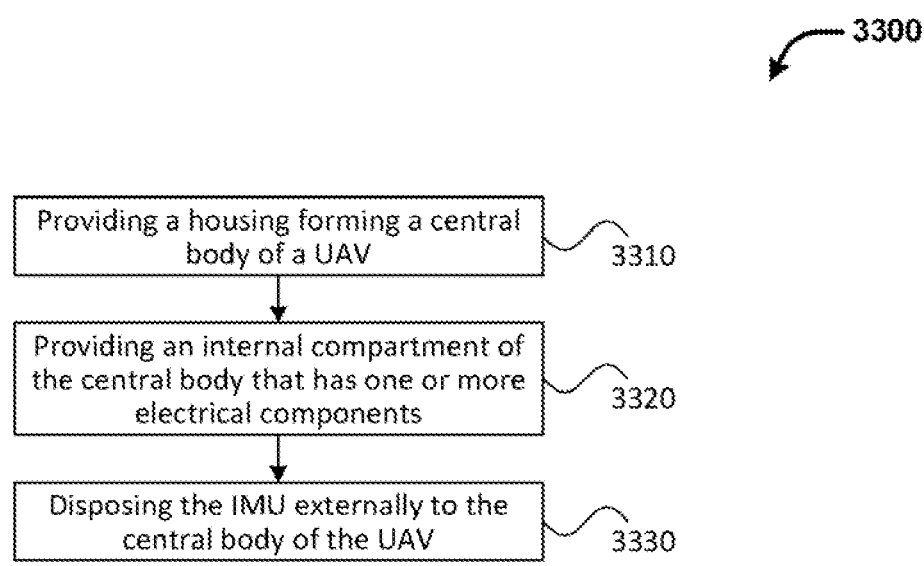
FIG. 33 illustrates a flowchart of a method of isolating an inertial measurement unit (IMU) within an unmanned aerial vehicle, in accordance with an embodiment of the disclosure.

FIG. 33 illustrates a flowchart 3300 of a method of isolating an inertial measurement unit (IMU) within an unmanned aerial vehicle (UAV), in accordance with an embodiment of the disclosure. At block 3310, a housing forming a central body of a UAV is provided. At block 3320, an internal component of the central body that has one or more electrical components is provided. The one or more electrical components are disposed within the internal compartment of the central body. Additionally, the one or more electrical components are adapted to affect operation of the UAV. At block 3330, the IMU is disposed externally to the central body. In particular, the IMU is isolated from the internal compartment.

Figure 34:
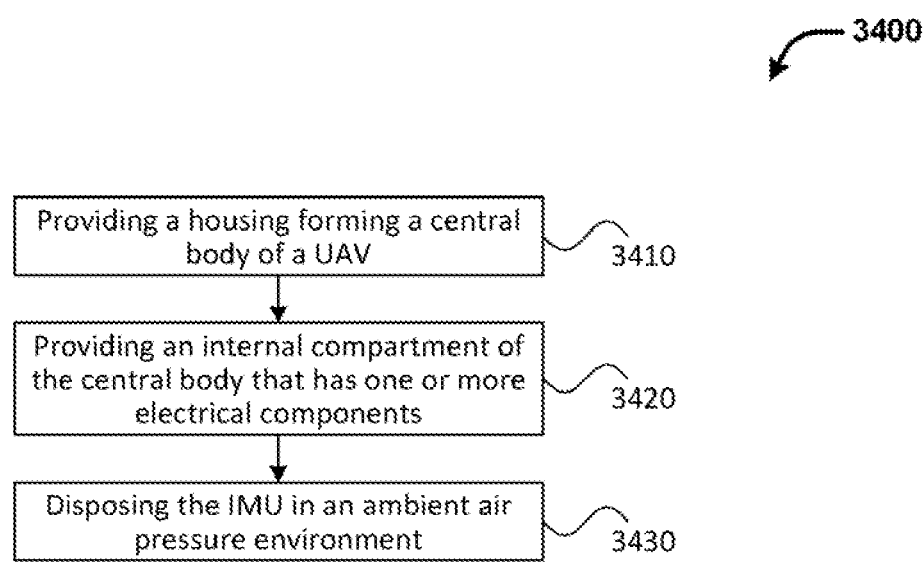
FIG. 34 illustrates another flowchart of a method of isolating an inertial measurement unit (IMU) within an unmanned aerial vehicle, in accordance with an embodiment of the disclosure.

FIG. 34 illustrates another flowchart 3400 of a method of isolating an inertial measurement unit (IMU) within an unmanned aerial vehicle (UAV), in accordance with an embodiment of the disclosure. At block 3410, a housing forming a central body of a UAV is provided. At block 3420, an internal component of the central body that has one or more electrical components is provided. The one or more electrical components are disposed within the internal compartment of the central body. Additionally, the one or more electrical components are adapted to affect operation of the UAV. Further, when the UAV operates, the one or more electrical components may operate at a negative air pressure environment. At block 3430, the IMU is disposed in an ambient air pressure environment. In particular, the IMU is isolated from the internal compartment.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. An unmanned aerial vehicle (UAV) comprising:
   a housing forming a central body of the UAV, the housing comprising an internal compartment;
   one or more electrical components disposed within the internal compartment and configured to affect operation of the UAV; and
   an inertial measurement unit (IMU) disposed in an external compartment external to the central body,
   wherein the IMU is isolated from the internal compartment such that a barometric pressure in the external compartment is independent of a barometric pressure in the internal compartment.

2. The vehicle of claim 1, wherein the IMU is attached to an exterior surface of the central body.

3. The vehicle of claim 1, wherein the IMU is supported by one or more extension members extending away from the central body.

4. The vehicle of claim 1, wherein the IMU is at least partially shielded from ambient air.

5. The vehicle of claim 1, wherein the one or more electrical components comprise at least one exhaust fan.

6. The vehicle of claim 5, wherein the at least one exhaust fan generates negative pressure within the internal compartment.

7. The vehicle of claim 1, wherein the internal compartment is in barometric communication with at least one exhaust fan.

8. The vehicle of claim 1, wherein the IMU is isolated from an internal circulation system within the internal compartment of the UAV.

9. The vehicle of claim 1, wherein the IMU experiences a pressure of ambient air of the environment around the UAV.

10. The vehicle of claim 9, wherein the IMU communicates with the ambient air.

11. The vehicle of claim 1, wherein the internal compartment communicates with one or more arms of the UAV.

12. The vehicle of claim 11, wherein air flow into the central body is generated by the one or more arms.

13. The vehicle of claim 12, wherein the air flow is generated by rotation of one or more rotors supported by the one or more arms.

14. The vehicle of claim 12, wherein the air flow cools down the one or more electric components within the internal compartment.

15. The vehicle of claim 1, further comprising a motor having auxiliary airflow generating components.

16. The vehicle of claim 15, wherein the auxiliary airflow generating components comprise blades within an upper cover of the motor.

17. The vehicle of claim 15, wherein the auxiliary airflow generating components comprise a fan within an upper cover of the motor.

18. A method of isolating an inertial measurement unit (IMU) within an unmanned aerial vehicle (UAV) comprising:
    providing a UAV comprising:
       a housing forming a central body of the UAV and including an internal compartment; and
       one or more electrical components disposed in the internal compartment and configured to affect operation of the UAV; and
    disposing the IMU externally to the central body of the UAV, wherein the IMU is isolated from the internal compartment.

19. The method of claim 18, wherein the IMU is at least partially shielded from ambient air.

20. The method of claim 18, wherein the IMU is fully exposed to ambient air.

* * * * *